United States Patent
Michalscheck et al.

(10) Patent No.: US 9,898,001 B2
(45) Date of Patent: Feb. 20, 2018

(54) SYSTEMS AND METHODS FOR ENHANCING MONITORING OF AN INDUSTRIAL AUTOMATION SYSTEM

(71) Applicant: Rockwell Automation, Inc., Milwaukee, WI (US)

(72) Inventors: Kelly A. Michalscheck, Racine, WI (US); Jimi R. Michalscheck, Racine, WI (US); Jessica L. Korpela, Milwaukee, WI (US); Kyle K. Reissner, Hudson, OH (US); David A. Vasko, Hartland, WI (US); Matthew W. Fordenwalt, Hudson, OH (US); John J. Jauquet, Milwaukee, WI (US); Matthew R. Ericsson, Lyndhurst, OH (US); Andrew Wilber, Franklin, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 248 days.

(21) Appl. No.: 14/752,362

(22) Filed: Jun. 26, 2015

(65) Prior Publication Data

US 2016/0282843 A1 Sep. 29, 2016

Related U.S. Application Data

(60) Provisional application No. 62/139,182, filed on Mar. 27, 2015.

(51) Int. Cl.
*G08B 21/00* (2006.01)
*G05B 19/418* (2006.01)
(Continued)

(52) U.S. Cl.
CPC .......... *G05B 19/4185* (2013.01); *F16K 31/00* (2013.01); *F16K 35/00* (2013.01);
(Continued)

(58) Field of Classification Search
CPC .............. G05B 19/4185; G05B 19/409; G05B 19/41875; G05B 19/042; G05B 19/0426;
(Continued)

(56) References Cited

U.S. PATENT DOCUMENTS 5,714,808 A * 2/1998 Ansel ...................... F21V 23/04
307/112
2007/0194944 A1* 8/2007 Galera ...................... F16P 3/14
340/686.6

(Continued)

OTHER PUBLICATIONS

Vanhemert, Kyle; GE's Radical Software Helps Jet Engines Fix Themselves; http://www.wired.com/2013/10/three-design-trends-ges-using-to-make-software-for-jet-engines-and-wind-turbines/; Oct. 10, 2013.

*Primary Examiner* — Daniel Previl
(74) *Attorney, Agent, or Firm* — Fletcher Yoder, P.C.

(57) ABSTRACT

In one embodiment, a tangible, non-transitory computer-readable medium includes computer instructions configured to receive image data from an apparatus, wherein the image data comprises a person within a proximity to an industrial automation device, determine whether the person is wearing a set of personal protection equipment (PPE) based on the image data, disable one or more operations of the industrial automation device when the person is not wearing the set of PPE, and track a usage of the set of PPE.

20 Claims, 10 Drawing Sheets

(51) Int. Cl.

| | |
|---|---|
| *G05B 19/042* | (2006.01) |
| *G05B 19/406* | (2006.01) |
| *G07C 9/00* | (2006.01) |
| *F16K 31/00* | (2006.01) |
| *F16K 35/00* | (2006.01) |
| *F16K 37/00* | (2006.01) |
| *H02J 4/00* | (2006.01) |
| *G06F 17/18* | (2006.01) |
| *G07C 3/00* | (2006.01) |

(52) U.S. Cl.
CPC ........ *F16K 37/0025* (2013.01); *G05B 19/042* (2013.01); *G05B 19/406* (2013.01); *G05B 19/4183* (2013.01); *G05B 19/4184* (2013.01); *G05B 19/41875* (2013.01); *G06F 17/18* (2013.01); *G07C 3/00* (2013.01); *G07C 9/00111* (2013.01); *G07C 9/00309* (2013.01); *G07C 9/00896* (2013.01); *H02J 4/00* (2013.01); *G05B 2219/21147* (2013.01); *G05B 2219/31229* (2013.01); *G05B 2219/32368* (2013.01); *G05B 2219/39251* (2013.01); *G05B 2219/50193* (2013.01); *Y02P 80/11* (2015.11); *Y02P 80/12* (2015.11); *Y02P 90/02* (2015.11); *Y02P 90/10* (2015.11)

(58) Field of Classification Search
CPC .............. G05B 19/406; G05B 19/4183; G05B 2219/21147; G05B 2219/31229; G05B 2219/32368; G05B 2219/36159; G05B 2219/39251
USPC .... 340/540, 686.1, 686.6, 10.1, 3.3, 825.23, 340/5.1, 5.2, 539.13, 426.26, 426.2
See application file for complete search history.

(56) References Cited

U.S. PATENT DOCUMENTS

| | | | | |
|---|---|---|---|---|
| 2012/0146789 | A1* | 6/2012 | De Luca | G08B 21/12 340/540 |
| 2013/0127980 | A1* | 5/2013 | Haddick | G06F 3/013 348/14.08 |
| 2014/0307076 | A1* | 10/2014 | Deutsch | G08B 21/02 348/77 |
| 2016/0093184 | A1* | 3/2016 | Locke | H04N 7/183 348/143 |

\* cited by examiner

SYSTEMS AND METHODS FOR ENHANCING MONITORING OF AN INDUSTRIAL AUTOMATION SYSTEM

CROSS REFERENCE TO RELATED APPLICATIONS

This application claims priority from and the benefit of U.S. Provisional Application Ser. No. 62/139,182, entitled "Systems and Methods for Exchanging Information Between Devices in an Industrial Automation Environment," filed Mar. 27, 2015, which is hereby incorporated by reference in its entirety.

BACKGROUND

The present disclosure generally relates to an industrial enterprise. More particularly, the present disclosure relates to systems and methods for assessing a quality of various components and entities that are associated with an industrial automation system, operations performed by the industrial automation system, personnel working with the industrial automation system, and the like.

BRIEF DESCRIPTION

In one embodiment, a tangible, non-transitory computer-readable medium includes computer instructions configured to receive image data from an apparatus, wherein the image data comprises a person within a proximity to an industrial automation device, determine whether the person is wearing a set of personal protection equipment (PPE) based on the image data, disable one or more operations of the industrial automation device when the person is not wearing the set of PPE, and track a usage of the set of PPE.

In one embodiment, a method includes receiving, via a processor, image data from an apparatus. The image data includes a person within a proximity to an industrial automation device. The method also includes determining, via the processor, whether the person is wearing a set of personal protection equipment (PPE) based on the image data, disabling, via the processor, one or more operations of the industrial automation device when the person is not wearing the set of PPE, and tracking, via the processor, a usage of the PPE.

In one embodiment, a system includes an industrial automation device configured to perform an automated operation and to operate in an area of a facility. The system also includes an apparatus configured to detect whether a person within a first proximity of the industrial automation device is wearing a set of personal protection equipment (PPE). The system also includes a processor configured to disable operations of the industrial automation device when the person is not wearing the set of PPE, track usage of the set of PPE by the person, and store the usage of the set of PPE on a storage device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
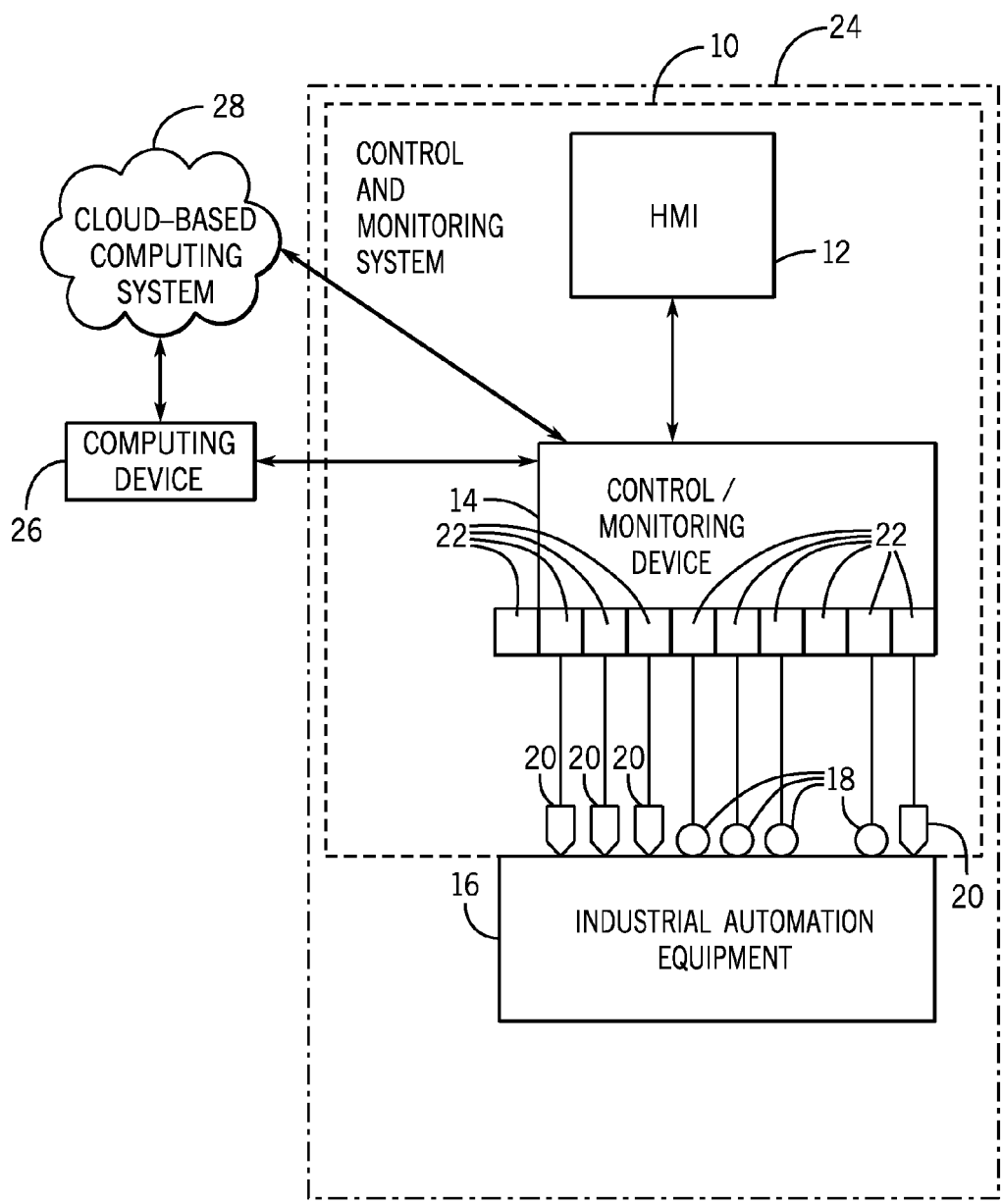
FIG. 1 is a diagrammatical representation of an exemplary control and monitoring system, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Generally, the present disclosure discusses numerous concepts regarding how devices in an industrial automation system may exchange information with each other and use this shared information to assist users in the industrial automation environment to manage the operations and maintenance of the devices. In one embodiment, the industrial automation system may include a communication architecture that is structured according to a tri-partite paradigm that facilitates communications between a device, a computing device, and a cloud-based computing system. The information shared between each component within this tri-partite structure may enable various devices within the industrial automation system to operate more efficiently, users to perform tasks related to the conditions or operations of the industrial automation system more efficiently and generally provide for improved operations of the industrial automation system. In addition, the information shared within the tri-partite structure may provide data that may assess a quality of the industrial automation system, the personnel operating with the industrial automation system, the components or machines operating as part of the industrial automation system, and each of these listed properties, which together make up an industrial enterprise.

Certain operations performed by technicians, machinery, and/or processes in a factory, plant, and the like, may involve performing certain procedures to ensure that the operations are executed properly. For instance, when preparing to service an industrial automation device (e.g., drive), a technician may follow a lockout-tagout procedure associated with placing the particular industrial automation device offline before performing the service operations. As technicians regularly perform these types of servicing operations, it may be beneficial to evaluate how well the technician performs the procedures associated with placing the equipment offline, as well as how well the technician performs the servicing operations. In addition to evaluating the performance of a technician, it may be beneficial to evaluate the performance of the industrial automation devices that are part of the industrial automation system and other components that are associated with the operations of the industrial automation system.

Each of the components that are associated with the operations of the industrial automation system make up an industrial enterprise. Accordingly, some embodiments of the present disclosure relate to tracking the performance of components of the industrial enterprise. In some embodiments, a tri-partite paradigm or communication network may enable at least three components to exchange information regarding an industrial automation system between each other more efficiently. The components of the communication network may include, in one example, a computing device, a device or machine operating in an industrial automation system, and a cloud-based computing system communicatively coupled to the computing device and the equipment in the industrial automation system. In one embodiment, this tri-partite paradigm may involve a software application operating on a computing device, such that the software application may monitor, control, access, or view an automation device in the industrial automation system, and to track a performance of the device (e.g., machine), a technician operating the device, or both.

Using the information obtained by the software application via the computing device, a processor may determine a performance for any component in the industrial enterprise. In some embodiments, the industrial enterprise may be organized according to a hierarchy, which may include levels such as an organization, a factory for the organization, a machine in the factory, the technicians working in the factory, and so forth. For example, in some embodiments, software executed by the computing device may track the performance for various operations performed by the technician using the software. The software may be used to assist the technician with regard to the maintenance and operation of equipment in an industrial automation system. In one example, the software may assist the technician to perform a lockout-tagout procedure, which may detail how to place equipment offline to enable the technician to perform maintenance on the respective equipment.

Lockout-tagout procedures are used throughout various industries and research settings to ensure that machinery and/or processes are placed offline properly and not started prior to the completion of maintenance or servicing. Generally, a lockout-tagout procedure may include physically locking a part of the machinery in one position (e.g., off) to prevent the part from shifting to an alternate position (e.g., on). The procedure may then involve tagging or placing a label on the device to indicate that the machinery is locked out or is being serviced. Typically, the tag may include information such as a statement (e.g., "do not operate—equipment locked out") and the information of the person who affixed the tag to the device.

Based on certain factors, such as how well the technician follows the procedures set forth by the software, the software may generate a score for the technician. Likewise, the software may track the performance of a machine in a factory using certain factors, such as production, network quality, and the like, to generate a score for the machine. In addition, the software may generate a visualization that depicts the performance or score of each of the components of the industrial enterprise. The scores may enable a user to assess the quality of the components of the industrial enterprise and to make informed decisions, such as how to operate various machines of the industrial automation system based on various components in the enterprise indicating which components are performing adequately and which are not. In some instances, maintenance, service, technician replacement, and the like may be performed and/or scheduled to improve performance of underperforming areas of the industrial enterprise.

FIG. 1 is a diagrammatical representation of an exemplary control and monitoring system 10, in accordance with embodiments presented herein. In FIG. 1, the control and monitoring system 10 is illustrated as including a human machine interface (HMI) 12 and a control/monitoring device or automation controller 14 adapted to interface with devices that may monitor and control various types of industrial automation equipment 16. It should be noted that such an interface in accordance with embodiments of the present techniques may be facilitated by the use of certain network strategies. Indeed, an industry standard network may be employed, such as DeviceNet, to enable data transfer. Such networks permit the exchange of data in accordance with a predefined protocol, and may provide power for operation of networked elements.

The industrial automation equipment 16 may take many forms and include devices for accomplishing many different and varied purposes. For example, the industrial automation equipment 16 may include machinery used to perform various operations in a compressor station, an oil refinery, a batch operation for making food items, a mechanized assembly line, and so forth. Accordingly, the industrial automation equipment 16 may comprise a variety of operational components, such as electric motors, valves, actuators, temperature elements, pressure sensors, or a myriad of machinery or devices used for manufacturing, processing, material handling and other applications.

Additionally, the industrial automation equipment 16 may include various types of equipment that may be used to perform the various operations that may be part of an industrial application. For instance, the industrial automation equipment 16 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 16 may also include controllers, input/output (I/O) modules, motor control centers, motors, human machine interfaces (HMIs), operator interfaces, contactors, starters, sensors 18, actuators 20, drives, relays, protection devices, switchgear, compressors, network switches (e.g., Ethernet switches, modular-managed, fixed-managed, service-router, industrial, unmanaged, etc.) and the like.

In certain embodiments, one or more properties of the industrial automation equipment 16 may be monitored and controlled by certain equipment for regulating control variables used to operate the industrial automation equipment 16. For example, sensors 18 and actuators 20 may monitor various properties of the industrial automation equipment 16 and may adjust operations of the industrial automation equipment 16, respectively.

In some cases, the industrial automation equipment 16 may be associated with devices used by other equipment. For instance, scanners, gauges, valves, flow meters, and the like may be disposed on industrial automation equipment 16. Here, the industrial automation equipment 16 may receive data from the associated devices and use the data to perform their respective operations more efficiently. For example, a controller (e.g., control/monitoring device 14) of a motor drive may receive data regarding a temperature of a connected motor and may adjust operations of the motor drive based on the data.

In certain embodiments, the industrial automation equipment 16 may include a computing device and/or a communication component that enables the industrial equipment 16 to communicate data between each other and other devices. The communication component may include a network interface that may enable the industrial automation equipment 16 to communicate via various protocols such as EtherNet/IP, ControlNet, DeviceNet, or any other industrial communication network protocol. Alternatively, the communication component may enable the industrial automation equipment 16 to communicate via various wired or wireless communication protocols, such as Wi-Fi, mobile telecommunications technology (e.g., 2G, 3G, 4G, LTE), Bluetooth®, near-field communications technology, and the like.

The sensors 18 may be any number of devices adapted to provide information regarding process conditions. The actuators 20 may include any number of devices adapted to perform a mechanical action in response to a signal from a controller (e.g., the automation controller 14). The sensors 18 and actuators 20 may be utilized to operate the industrial automation equipment 16. Indeed, they may be utilized within process loops that are monitored and controlled by the control/monitoring device 14 and/or the HMI 12. Such a process loop may be activated based on process inputs (e.g., input from a sensor 18) or direct operator input received through the HMI 12. As illustrated, the sensors 18 and actuators 20 are in communication with the control/monitoring device 14. Further, the sensors 18 and actuators 20 may be assigned a particular address in the control/monitoring device 14 and receive power from the control/monitoring device 14 or attached modules.

Input/output (I/O) modules 22 may be added or removed from the control and monitoring system 10 via expansion slots, bays or other suitable mechanisms. In certain embodiments, the I/O modules 22 may be included to add functionality to the control/monitoring device 14, or to accommodate additional process features. For instance, the I/O modules 22 may communicate with new sensors 18 or actuators 20 added to monitor and control the industrial automation equipment 16. It should be noted that the I/O modules 22 may communicate directly to sensors 18 or actuators 20 through hardwired connections or may communicate through wired or wireless sensor networks, such as Hart or IOLink.

Generally, the I/O modules 22 serve as an electrical interface to the control/monitoring device 14 and may be located proximate or remote from the control/monitoring device 14, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the I/O modules 22 are configured to transfer input and output signals between the control/monitoring device 14 and the industrial automation equipment 16. As illustrated, the sensors 18 and actuators 20 may communicate with the control/monitoring device 14 via one or more of the I/O modules 22 coupled to the control/monitoring device 14.

In certain embodiments, the control/monitoring system 10 (e.g., the HMI 12, the control/monitoring device 14, the sensors 18, the actuators 20, the I/O modules 22) and the industrial automation equipment 16 may make up an industrial application 24. The industrial application 24 may involve any type of industrial process or system used to manufacture, produce, process, or package various types of items. For example, the industrial applications 24 may include industries such as material handling, packaging industries, manufacturing, processing, batch processing, and the like.

In certain embodiments, the control/monitoring device 14 may be communicatively coupled to a computing device 26 and a cloud-based computing system 28. In this network, input and output signals generated from the control/monitoring device 14 may be communicated between the computing device 26 and the cloud-based computing system 28.

Figure 2:
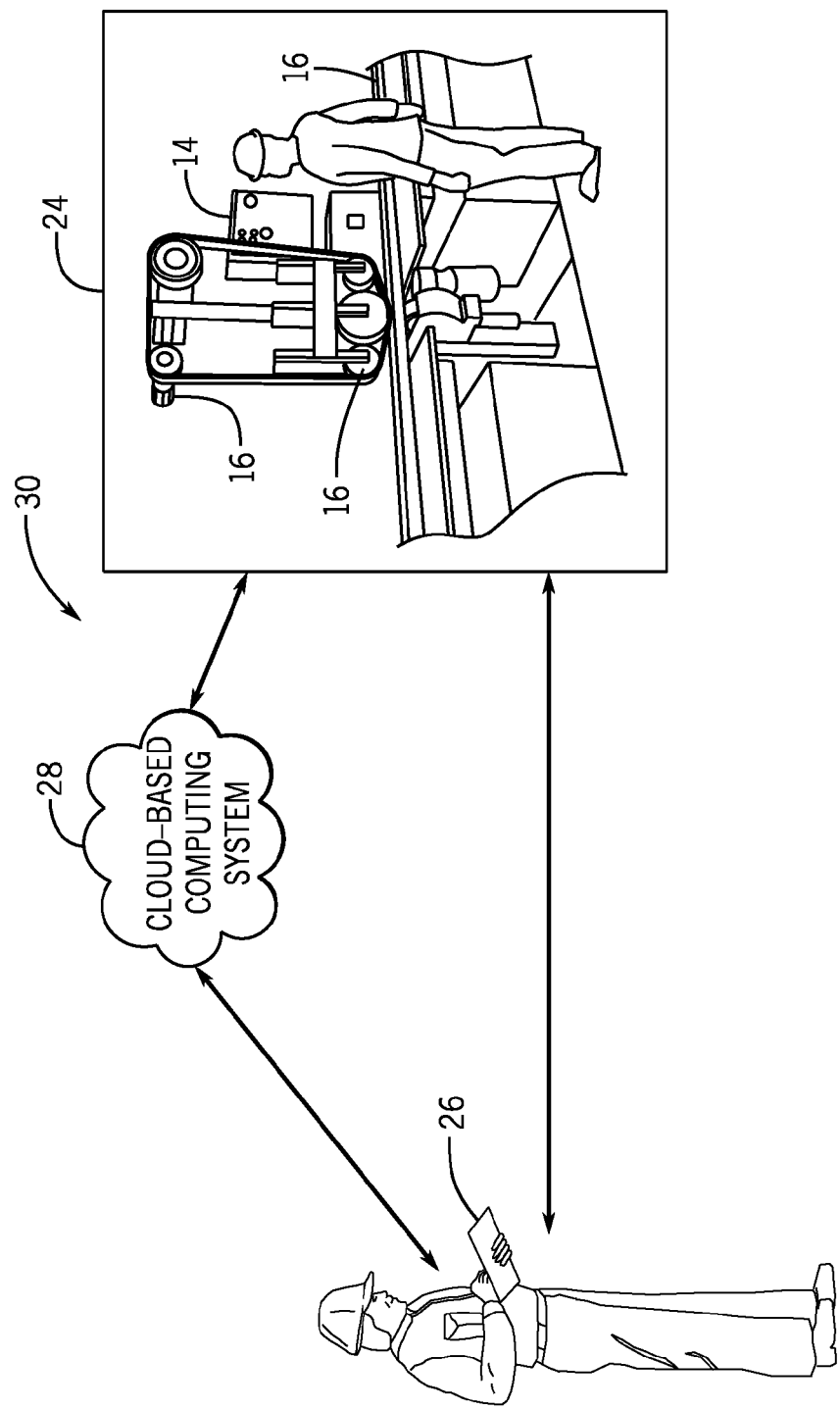
FIG. 2 is a schematic representation of a communication network, in accordance with embodiments presented herein.

FIG. 2 is a schematic representation of a communication network 30 that enables devices to communicate with each other within an industrial application, in accordance with embodiments presented herein. As such, the communication network 30 enables devices that are part of the industrial application 24 to communicate with each other and with other devices that are not part of the industrial application 24. As mentioned above, the industrial application 24 may be in the material handling, packaging industries, manufacturing, processing, batch processing, or any technical field that employs the use of the industrial automation equipment 16.

With the foregoing in mind, in one embodiment, data acquired by the industrial automation equipment 16 may be transmitted to a computing device 26. The computing device 26 may be a computing device that may include communication abilities, processing abilities, and the like. For example, the computing device 26 may be any general computing device that may monitor, control, and/or operate one or more of the industrial automation equipment 16. As such, the computing device 26 may be a laptop computer, a tablet computer, a mobile phone device computing device, a general personal computer, a wearable computing device, or the like. Additional details regarding the computing device 26 will be discussed below with reference to FIG. 3.

In addition to communicating with the industrial automation equipment 16, the computing device 26 may also communicate with the cloud-based computing system 28. The cloud-based computing system 28 may be a cloud-accessible platform that may include one or more servers, one or more computing devices (e.g., general purpose computers), and the like. In any case, the cloud-based computing system 28 may include a number of computers that may be connected through a real-time communication network, such as the Internet, Ethernet, EtherNet/IP, ControlNet, or the like, such that the multiple computers may operate together as a single entity. The real-time communication network may include any network that enables various devices to communicate with each other at near real-time or such that data is communicated with each other at near instantaneous speeds. In one embodiment, the cloud-based computing system 28 may be capable of communicating with the industrial automation equipment 16 and the computing device 26. As such, the cloud-based computing system 28 may be capable of wired or wireless communication between the industrial automation equipment 16 and the computing device 26. In one embodiment, the cloud-based computing system 28 may be accessible via the Internet or some other network.

After establishing a communication connection between the computing device 26 and the industrial automation equipment 16 (e.g., via an associated control/monitoring device 14 or computing device of the industrial automation equipment 16), the cloud-based computing system 28 may receive data acquired by the computing device 26 and the industrial automation equipment 16. After receiving this data, in one embodiment, the cloud-based computing system 28 may perform large-scale data analysis operations on the data, such that the operations may be distributed over the computers that make up the cloud-based computing system 28.

In another embodiment, the cloud-based computing system 28 may forward acquired data or analyzed data to different computing devices, various industrial automation equipment, or the like. As such, the cloud-based computing system 28 may maintain a communication connection with various industrial automation equipment 16, computing devices 26, and the like. Additional details regarding the cloud-based computing system 28 will be discussed below with reference to FIG. 4.

Figure 3:
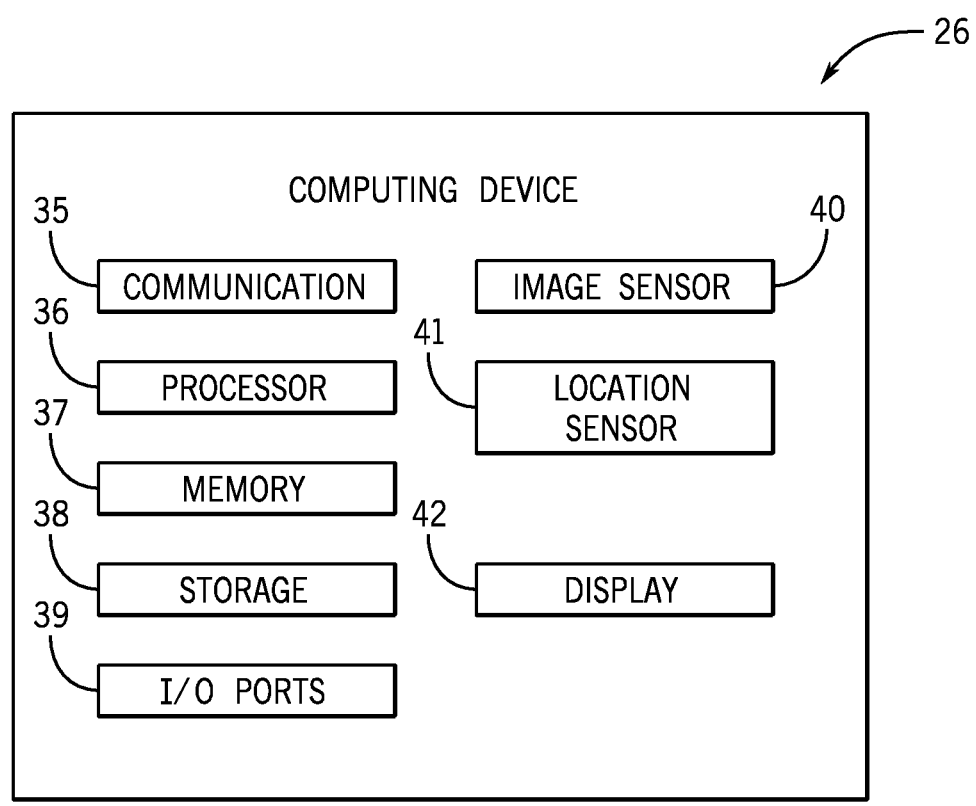
FIG. 3 is a block diagram of example components within a computing device that is part of the communication network of FIG. 2, in accordance with embodiments presented herein.

FIG. 3 is a block diagram of example components within the computing device 26 that is part of the communication network 30, in accordance with embodiments presented herein. For example, the computing device 26 may include a communication component 35, a processor 36, a memory 37, a storage 38, input/output (I/O) ports 39, an image sensor 40 (e.g., a camera), a location sensor 41, a input/display 42, additional sensors (e.g., vibration sensors, temperature sensors) and the like. The communication component 35 may be a wireless or wired communication component that may facilitate communication between the industrial automation equipment 16, the cloud-based computing system 28, and other communication capable devices (e.g., apparatuses described below).

The processor 36 may be any type of computer processor or microprocessor capable of executing computer-executable code. The processor 36 may also include multiple processors that may perform the operations described below.

The memory 37 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 36 to perform the presently disclosed techniques. Generally, the processor 36 may execute software applications that include programs that enable a user to track and/or monitor operations of the industrial automation equipment 16 via a local or remote communication link. That is, the software applications may communicate with the control/monitoring device 14 and gather information associated with the industrial automation equipment 16 as determined by the control/monitoring device 14, via sensors disposed on the industrial automation equipment 16, and the like.

The memory 37 and the storage 38 may also be used to store the data, analysis of the data, the software applications, and the like. The memory 37 and the storage 38 may represent non-transitory computer-readable media (e.g., any suitable form of memory or storage) that may store the processor-executable code used by the processor 36 to perform various techniques described herein. It should be noted that non-transitory merely indicates that the media is tangible and not a signal.

In one embodiment, the memory 37 and/or storage 38 may include a software application that may be executed by the processor 36 and may be used to monitor, control, access, or view one of the industrial automation equipment 16. As such, the computing device 26 may communicatively couple to industrial automation equipment 16 or to a respective computing device of the industrial automation equipment 16 via a direct connection between the devices or via the cloud-based computing system 28.

The I/O ports 39 may be interfaces that may couple to other peripheral components such as input devices (e.g., keyboard, mouse), sensors, input/output (I/O) modules, and the like. I/O modules may enable the computing device 26 to communicate with the industrial automation equipment 16 or other devices in the industrial automation system via the I/O modules.

The image sensor 40 may include any image acquisition circuitry such as a digital camera capable of acquiring digital images, digital videos, or the like. The location sensor 41 may include circuitry designed to determine a physical location of the computing device 26. In one embodiment, the location sensor 41 may include a global positioning system (GPS) sensor that acquires GPS coordinates for the computing device 26. In another embodiment, the location sensor 41 may include other circuitry such as a radio wave transmitter, an infrared sensor, and the like that may acquire data that may be used to determine a location of the computing device 26 with respect to other industrial automation equipment 16 or other fixtures in the industrial automation system. In certain embodiments, the computing device 26 may also include various other sensors that may provide additional data related to an environment in which the computing device 26 exists. For instance, the other sensors may include an accelerometer, a gas (e.g., smoke, carbon monoxide) sensor, or the like.

The display 42 may depict visualizations associated with software or executable code being processed by the processor 36. In one embodiment, the display 42 may be a touch display capable of receiving inputs from a user of the computing device 26. As such, the display 42 may serve as a user interface to communicate with the industrial automation equipment 16. The display 42 may be used to display a graphical user interface (GUI) for operating the industrial automation equipment 16, for tracking the maintenance of the industrial automation equipment 16, performing various procedures (e.g., lockout tagout, placing device offline, replacing component, servicing device) for the industrial automation equipment 16, and the like. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the industrial automation equipment 16 or for a number of pieces of industrial automation equipment in the industrial application 24, to control the general operations of the industrial application 24. In some embodiments, the operator interface may be characterized as the HMI 12, a human-interface machine, or the like.

Although the components described above have been discussed with regard to the computing device 26, it should be noted that similar components may make up the control/monitoring device 14. Moreover, the computing device 26 may also be part of the industrial automation equipment 16, and thus may monitor and control certain operations of the industrial automation equipment 16. Further, it should be noted that the listed components are provided as example components and the embodiments described herein are not to be limited to the components described with reference to FIG. 3.

Figure 4:
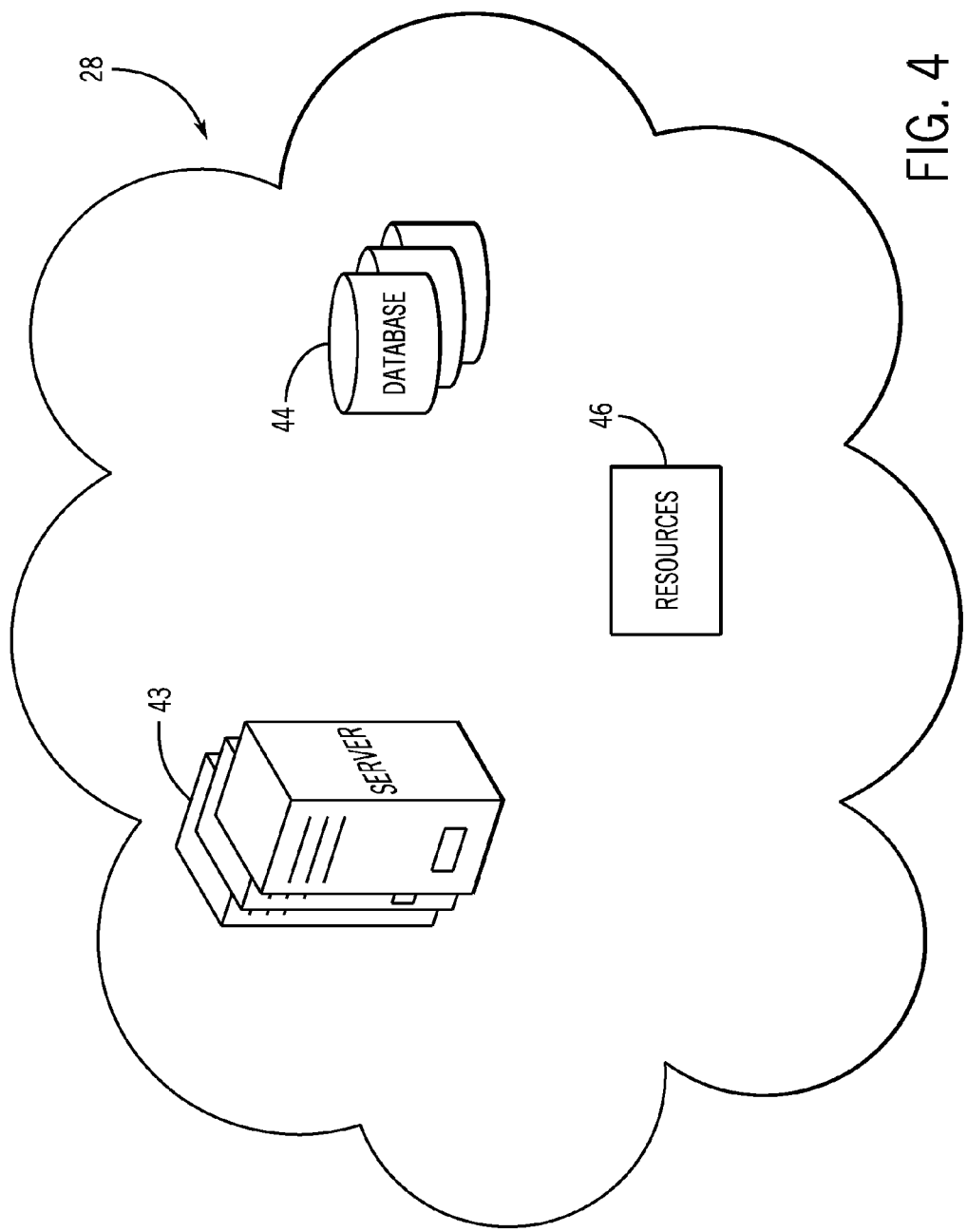
FIG. 4 is a block diagram of example components within a cloud-based computing system of the communication network of FIG. 2, in accordance with embodiments presented herein.

FIG. 4 is a block diagram of example components within the cloud-based computing system 28 of the communication network 30 of FIG. 2, in accordance with embodiments presented herein. As mentioned above, the cloud-based computing system 28 may include a number of computing devices, such as servers 43 that may be communicatively coupled to each other and may distribute various tasks between each other to perform the tasks more efficiently. In certain embodiments, each server 43 may include the example components described above as part of the computing device 26 in FIG. 3.

The cloud-based computing system 28 may also have access to a number of databases 44. The databases 44 may be related to various aspects of the industrial automation system, the industrial automation equipment 16, the computing device 26, operators of the computing device 26 or the industrial automation equipment 16, or the like. For example, the databases 44 may include information regarding procedures for operating and/or maintaining the industrial automation equipment 16. The procedures, as such, may include steps to perform, tools to use, personal protective equipment to wear, and the like with regard to the operations being performed.

The databases 44 may also include information regarding various regulations related to how the industrial automation equipment 16 should be maintained or operated. Additionally, the regulations may be related to how maintenance operations should be documented by the user of the computing device 26. The databases 44 may also include data related to warranty information for the industrial automation equipment 16, service contact information related to the industrial automation equipment 16, manuals for operating the industrial automation equipment 16, and other information that may be useful to an operator of the industrial automation equipment 16.

In certain embodiments, the cloud-based computing system 28 may also include access to various resources 46. The resources 46 may be a database or collection of published documents or webpages that may be related to the industrial automation equipment 16. As such, the resources 46 may be accessed by the cloud-based computing system 28 available via the Internet or other communication networks. The cloud-based computing system 28 may search or consult the resources 46 to acquire data related to the industrial automation equipment 16. For instance, the resources 46 may provide information regarding product recalls or safety concerns related to the industrial automation equipment 16, weather advisory notices for the industrial automation system, and the like. Additionally, the resources 46 may include hardware, software or firmware updates, software patches, vulnerability patches, certificates, and the like.

Figure 5:
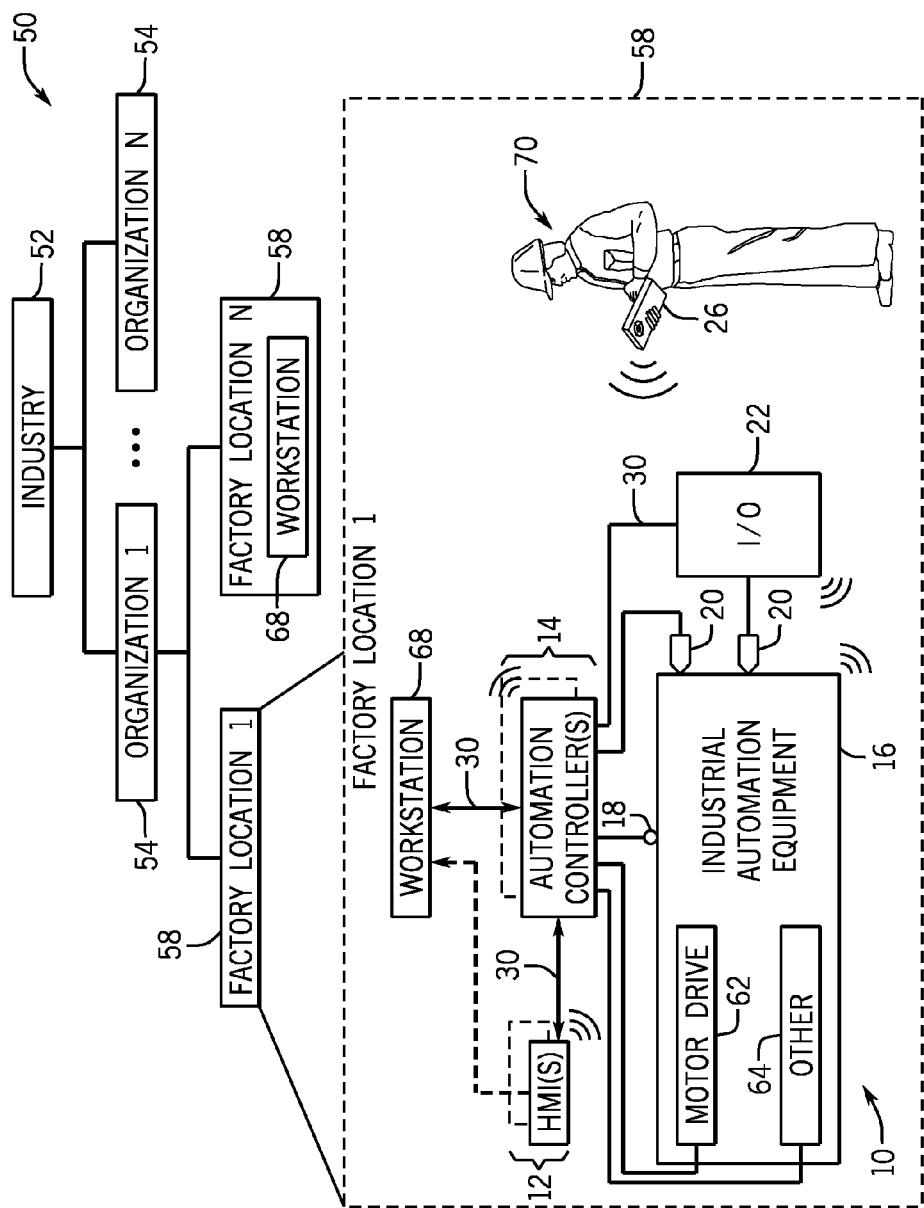
FIG. 5 is a diagrammatical representation of an industrial enterprise hierarchy, in accordance with embodiments presented herein.

FIG. 5 is a diagrammatical representation of an industrial enterprise hierarchy 50, in accordance with embodiments presented herein. As briefly mentioned above, the industrial enterprise hierarchy 50 may detail how various items of the industrial automation system are organized. It should be understood that each level of the industrial enterprise hierarchy 50 may be monitored and assigned a score for each item of the industrial automation system indicative of its performance throughout the following discussion. Moreover, scores of items disposed on one level of the industrial enterprise hierarchy 50 may be used to determine a score of an item that is on a higher level on the industrial enterprise hierarchy 50. For example, the score of an industry 52 may be determined based on the scores of the organizations 54. Additional details regarding the industrial enterprise hierarchy will now be discussed below.

Generally, the industrial enterprise hierarchy 50 may be envisioned by those skilled in the art as a "tree" with the top level being a root node. As depicted, the industrial enterprise hierarchy 50 may include an industry 52 as the root at the top level. The industry 52 may include any suitable type, such as manufacturing, agriculture, airline, automotive, banking, chemical, computer, and so forth. Children nodes of the industry 52 root node may include one or more organizations 54 from "organization 1" to "organization N." The organizations 54 may manufacture the same or different products. Additionally, the organizations 54 may include factory locations as children nodes. For example, organization 1 includes one or more factory locations 58 from "factory location 1" to "factory location N."

As illustrated, factory location 1 includes a control and monitoring system 10, which is illustrated as interacting with the industrial application 24 and one or more automation controllers 14 adapted to interface through the communication network 30 via input/output (I/O) module 22. An industrial data exchange communication protocol may be employed by the network 30, such as common industrial protocol (CIP) or other CIP derivative (DeviceNet, ControlNet, Ethernet/IP), Modbus, BACnet, or the like, to enable data transfer. Such networks permit the exchange of data in accordance with a predefined protocol, and may provide power for operation of networked elements.

As discussed above, the industrial application 24 may take many forms and may include various devices for accomplishing many different and varied purposes. Accordingly, the industrial application 24 may include a variety of operational components, such as motor drives 62, electric motors, valves, actuators, temperature elements, pressure sensors, or a myriad of manufacturing, processing, material handling, and other applications 64.

Further, the industrial equipment 16 may be controlled and monitored by equipment, such as the sensors 20 and the actuators 18, for regulating process variables of the industrial equipment 16 through automation and/or observation.

As illustrated, the sensors 20 and actuators 18 may communicate with the automation controller 14 in several ways. For example, the sensors 20 and actuators 18 may communicate with the automation controller 14 via an I/O module 22 by way of the network 30 or the sensors 20 and actuators 18 may be directly connected to the automation controller 14. The I/O module 22 may transfer input and output signals between the automation controller 14 and the industrial automation equipment 164. As such, the I/O module 22 serves as an electrical interface to the automation controller 14 and may be located proximate to or remote from the automation controller 14. Additionally, several I/O modules 22 may be used simultaneously to facilitate an appropriate amount of input and output signal capabilities of the control and monitoring system 10. Also, the automation controller 14 may include one or more sensors 18 connected directly to the actuators 18 in order to sense signals sent to the actuators 18 before actuation occurs or right after actuation occurs.

In the illustrated embodiment, the automation controller 14 and/or HMI 12 may be capable of communicating with external workstations 68 and other factory locations 58, such as "factory location N" via the network 30. The workstations 68 may be a computing device as described above. The automation controller 14 may wirelessly communicate with workstations 68 and/or other components located in the same or other factory locations 58, such as "factory location N." The various workstations 68, factory locations 58, organization 54 may all communicate with one another and data related to each component may be stored at the industry 52 level via network 16. Additionally or alternatively, data related to each component may be stored and used in the tri-partite paradigm or communication network disclosed herein.

In some embodiments, communication circuitry in the computing device 26 may enable a technician 70 to operate and/or view properties of the automation controller 14, HMI(s) 12, I/O assembly 22, industrial application 24, industrial automation equipment 34, motor drive 64, and/or other applications 22. The computing device 26 may include computer instructions stored on one or more non-transitory, tangible, computer-readable media (e.g., memory) that are executable by one or more processors. The computer instructions may be configured to shutdown the industrial automation equipment 34, control the industrial automation equipment 34 via remotely accessing the HMI(s) 12 and/or automation controller 14, view data passed between the components of the control and monitoring system 10, track the performance of the technician 70 and/or the industrial automation equipment 34 of the industrial hierarchy 50, determine a score indicative of the performance of the technician 70 and/or the components, and/or display the scores via a visualization on a display screen of the computing device 26, among other things.

With the foregoing in mind, each item described above with respect to the industrial enterprise hierarchy 50 may be used to determine a score for itself or another item that is part of the industrial enterprise hierarchy 50. For example, the maintenance records of the motor drive 62 may be recorded by the workstation 68. Using the maintenance records, the workstation 68 may determine a score related to the performance of the motor drive 62. The score for the motor drive 62 may, in turn, be used to determine a score for the corresponding factory location 68, the corresponding organization 54, and the corresponding industry 52.

In addition to scores for various items on the industrial enterprise hierarchy 50, scores for a technician 70 performing operations on items of the industrial enterprise hierarchy 50 and/or scores for the industrial application 24 may be determined based on various scoring factors, described in detail below. For example, computer instructions executed on some computing device (e.g., workstation 68, cloud-based computing system 28) may consider a "procedures followed" scoring factor that relates to certain steps (e.g., wearing proper personal protection equipment, scanning equipment tag) being performed by the technician 70 before performing certain operations on equipment (e.g., placing equipment offline). Based on whether technician 70 follows each step recited in the procedures, the computer instructions may generate a performance score for the technician 70. In some embodiments, the score may be continuously updated after each step is completed, when the entire set of procedures are completed, and/or as the technician 70 performs more tasks. Using the performance score, the computer instructions may assess a degree of non-compliance with the technician 70, evaluate productivity of the technician 70, or the like.

As briefly discussed above, in addition to determining a performance for the technician 70, the computer instructions may also track the performance of a machine using a score based on certain factors, described in detail below. In some embodiments, items in one level of the industrial enterprise hierarchy 50 may be based on the scores of the items in a sublevel of the hierarchy 50. For example, a score may be generated for factory locations 58 based on the scores of the items (e.g., industrial application 24) and/or technicians 70 included in sublevels under the respective factory location 58 according to the hierarchy 50. That is, a factory location 58 having a number of processes 16 and a number of technicians 70 working therein may be evaluated based on the performance of the machines (e.g., motor drive 62) of the industrial application 24 and the technicians 70 associated with the industrial application 24. Further, organizations 54 may be evaluated based on the performance of their associated factory locations 58 and the industry 52 may be evaluated based on the performance of the associated organizations 54. As such, various hierarchical levels of an industry 52 may be evaluated based on the items listed below a respective level.

Once the scores are determined for the technician 70, the industrial application 24, the factory location 58, the organization 54, the industry 52, and so forth, the computer instructions may generate a visualization that depicts the performance or score of the various items. In some embodiments, graphical indicators may be used to represent the scores. For example, in one embodiment, "stars" may be used and the number of stars assigned to a component may correlate to the score determined for that component. To illustrate, if a technician 70 receives a high score, then the computer instructions may generate five stars representative of the high score. On the other hand, if a technician 70 performs poorly or not according to specified procedures, then the computer instructions may generate one star representative of the low score.

Figure 6:
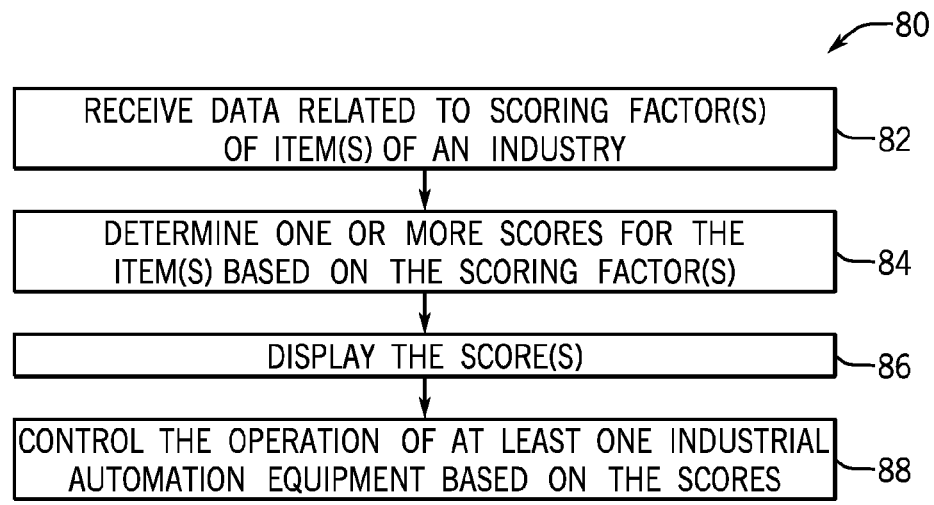
FIG. 6 is a flow diagram of a method for controlling operations of one or more components of an industrial enterprise, in accordance with embodiments presented herein.

FIG. 6 is a flow diagram of a method 80 for controlling operations of one or more components of an industrial enterprise, in accordance with embodiments presented herein. The method 80 may be implemented as computer instructions stored on the one or more tangible, non-transitory computer-readable medias (e.g., memories 37) and executable by the one or more processors 36. Although the following description of the method 80 is described with reference to the processor 36 of the computing device 26, it should be noted that the method 80 may be performed by other processors disposed on other devices that may be capable of communicating with the cloud-based computing system 28, the industrial automation equipment 16, or other components associated with the industrial application 24. Additionally, although the following method 80 describes a number of operations that may be performed, it should be noted that the method 80 may be performed in a variety of suitable orders and all of the operations may not be performed. It should be appreciated that the method 80 may be wholly executed by the computing device 26 (e.g., tablet) or the execution may be distributed between the cloud-based computing system 28 and the computing device 26. The method 80 may include receiving data related to scoring factors of items of the industrial enterprise (block 82), determining one or more scores for the items (block 84), displaying the scores (block 86), and controlling the operation of at least one industrial automation component 34 based on the scores (block 88).

In some embodiments, the processor 36 may receive data related to scoring factors of the various items (block 82) by receiving input from the items as a particular task is carried out. For example, the technician 70 may use the computing device 26 to assist placing the industrial automation equipment 16 offline according to a corresponding lockout-tagout protocol. The computer instructions may cause a display 42 of the computing device 26 to display a list of steps that the technician 70 should perform when placing the industrial automation equipment 16 offline. In some embodiments, the set of procedures that are displayed to the user may be associated with placing the machine on-line. Also, the set of procedures may be associated with the machine's or an industrial automation device's interactive operation. Additionally, the set of procedures may be associated with interactive maintenance of the machine or an industrial automation device. Further, the set of procedures may be associated with preventative maintenance of the machine or an industrial automation device.

Returning to the embodiment where the procedures relate to placing the machine off-line, the steps may include wearing proper personal protection equipment, scanning a tag of the industrial automation equipment 16, entering relevant information (e.g., identification numbers, sensor readings), an order in which to place pieces of equipment offline, adding a tag or label to each piece of equipment being placed offline, and the like. As each step is performed, the technician 70 may confirm that each step is performed using any suitable input means (e.g., touch screen, mouse, voice recognition capability) of the computing device 26.

Further, in some embodiments, the processor 36 may determine a score for each scoring factor of the items based on data received from one or more cameras and the like. For example, a camera attached or located proximate to the industrial automation equipment 16 may provide visual data to the computing device 26 and/or the cloud-based computing system 28, which may determine whether the technician 70 is wearing the proper personal protection equipment (PPE), performed preliminary procedures, performed various actions properly (e.g., attached tag to equipment), and so forth. Additionally, the data related to the scoring factors may be received from one or more sensors 18 configured to read or receive signals from electronic tags disposed on PPE. In some embodiments, a score for the technician may be generated based on a scoring factor related to whether the appropriate procedures were followed (e.g., PPE usage) using data indicating whether the technician 70 is wearing the appropriate PPE for the particular procedure. The processor 36 may also receive signals from sensors 18 associated with the machine.

In some embodiments, as described in more detail below, the data related to the scoring factors that is received may vary based on the component. For example, for technicians 70, data may be received for a set of scoring factors related to procedures followed, various training programs completed, safety procedures undertaken, and the like. For the industrial application 24, data may be received for a set of scoring factors related to maintenance of equipment used to perform the industrial application 24 (e.g., whether equipment is placed offline due to a detected condition), production metrics of the industrial application 24 (e.g., whether production rate is satisfactory), network accessibility of the industrial application 24 (e.g., whether network quality is satisfactory), asset quality or ratings of the equipment used to perform the industrial application 24 (e.g., whether a part has been recalled), and so forth. Based on the data received related to the scoring factors, the processor 36 may determine one or more scores for the respective item being evaluated (block 84). That is, the processor 36 may convert or transform the data received from the sensors 18, camera, or input by the technician 70 to a performance score for respective items of the industrial enterprise hierarchy 50. The score for any item of the industrial enterprise hierarchy 50 may be determined based on a scoring function that includes summing various weighted variables (e.g., scoring factors). In some embodiments, each of the scoring factors may be assigned a respective score and those respective scores may be added to produce the overall score for the component. It should be noted that some scoring factors may be weighted differently to influence the overall score more heavily than other scoring factors. The weights may be multipliers used to increase or decrease the weight of an associated factor.

Regarding the technicians 70, the processor 36 may continuously update a respective score for the technician 70 as the technician 70 performs additional tasks. By way of example, the performance score may be based on how well the technician follows the procedures set forth by the software. In some embodiments, to calculate a score, a number of points may be associated with each step in the procedures that the technician 70 is to perform, and the points are summed together as the technician 70 completes the respective step to generate a score for the "procedures followed" scoring factor. Additionally, a number of points may be associated with the length of time it takes the technician 70 to complete the task (e.g., lockout-tagout procedure), and the points may be added based on how long it takes the technician 70 to complete the task to generate a score for the "time to complete task" scoring factor. Further, a number of points may be added when the technician 70 actually completes the task to generate a score for the "task completed" scoring factor. On the other hand, a number of points may be subtracted from the score if the technician 70 does not complete the task. In addition, the performance score may consider information related to the technician 70 completing various training programs, safety procedures, or the like. That is, in some embodiments, a number of points may be associated with each training program and/or safety procedure undertaken by the technician 70, and the points may be summed together as the technician 70 completes the respective program or safety procedure to generate a score for the respective scoring factor. The details of how the scores are calculated for each machine scoring factor are discussed below with reference to FIG. 7.

The overall performance score may be used to assess certain other qualities of the technicians 70, as well. For example, the performance score may be used to determine the technician's efficiency at completing tasks, productivity, estimated time to completion of respective tasks, and so forth. Also, the performance score may be used to assess a degree of non-compliance with the technician 70.

One or more scores may also be determined for machinery of the industrial application 24. For example, a score may be determined for each of the following machine scoring factors of the industrial application 24: maintenance, production, network, asset, work flow, predictive problems, sustainable, and/or environmental. To generate a score for each scoring factor, a number of points may be associated with events and/or properties related to the scoring factors and the points may be summed by the processor 36 based on data received as the events occur and/or the properties are met to generate a score for the respective scoring factor. For example, to generate a score for the maintenance scoring factor, a number of points may be added to the score by the processor 36 based on data received that indicates that a machine employed by the industrial application 24 is placed offline after a certain condition is detected. In another example, a number of points may be added to the score for the maintenance scoring factor based on a percentage of time the machinery is shutdown. Additionally, a number of points may be added to the score for the environmental scoring factor based on the amount of gaseous emissions produced by the machinery. Further details of how the scores are calculated for each machine scoring factor are discussed below with reference to FIG. 8.

The scores of the various scoring factors may be summed to produce an overall score for the industrial application 24. As noted above, the various scoring factors may be weighted differently. For example, based on user preference or how the computer instructions are configured, maintenance may be weighted more heavily so that its score influences the overall score for the industrial application 24 more than the other scoring factors. It should be noted that the overall score is a result of the processor 36 converting/transforming signals received from sensors 18 and/or from input signals generated by the technician 70 interacting with the computing device 26.

Once the one or more scores for the various components are determined, the processor 36 may display the scores (block 86). In some embodiments, the scores may be displayed on a display 42 of the computing device 26. Additionally or alternatively, the scores may be displayed on a display screen of any suitable electronic device. For example, the scores may be displayed on a monitor in the workstation 68. As mentioned above, the scores may be visualized using any suitable graphical indicator, such as "stars." Further, as described in detail below, the various levels of the industrial enterprise hierarchy 50 may be depicted in a visualization using cascading representations where higher levels may be visible at a first level and the sub-levels of the hierarchy 50 including their respective components are accessible by drilling down to their respective level. In this way, the scores for each level of the industrial enterprise hierarchy 50 may be shown, which may enable recommendations to increase the scores to be made for the various levels and users to make more informed investment decisions based on the recommendations, as described below.

In addition, the processor 36 may control the operation of at least one industrial automation component 34 based on the scores (block 88). For example, if a technician 70 receives a score below a threshold, then the processor 36 may disable access to the control of certain industrial automation equipment 16 to prevent the technician 70 from performing any procedures (e.g., lockout-tagout procedures). In contrast, if a technician 70 receives a score above a threshold, then the processor 36 may enable access to control of certain industrial automation equipment 16 so the technician 70 can perform desired procedures (e.g., lockout-tagout procedure). Additionally, if the industrial application 24 receives a score below a threshold, then the processor 36 may execute a preventative action (e.g., power off the machines performing the industrial application 24, display an alert on the display 42, triggering an alarm, sending an alert to external systems).

Further, in some embodiments, the processor 36 may accumulate each score for the technician 70 and/or the machinery to show the trends in the rating of the technician and/or machinery so that recommendations for increasing the rating may be made. For example, the computing device 26 and/or the cloud-based computing system 28 may recommend certain retraining for the technician 70 if the technician 70 is continuously slow at performing tasks. In addition, the computing device 26 and/or cloud-based computing system 28 may recommend that alternatives to lockout-tagout be put in place when the machinery is taken offline more than a threshold number of times in a specified time period. As may be appreciated, providing recommendations to increase the ratings of individual components (e.g., technician, machinery) may enable a self-analyzing system that enables users to increase the rating for the organization 54 as a whole if the recommendations for the components are followed. That is, the scores and/or the trending of the scores may enable a user to make informed decisions as to where to make investments to improve the ratings of the individual components, which may increase the ratings of the entire organization 54.

Figure 7:
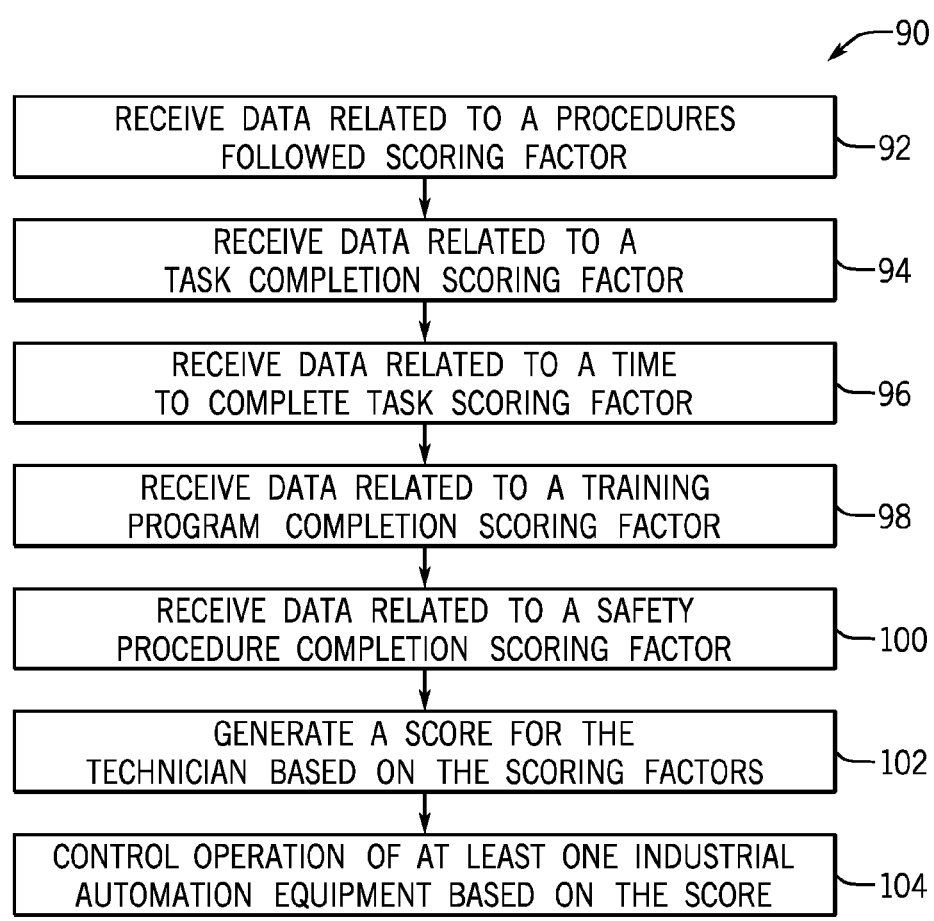
FIG. 7 is a flow diagram of a method for generating a score based on technician scoring factors, in accordance with embodiments presented herein.

FIG. 7 is a flow diagram of a method 90 for generating a score based on technician scoring factors, in accordance with embodiments presented herein. Although the following description of the method 90 is described with reference to the processor 36 of the computing device 26, it should be noted that the method 90 may be performed by other processors disposed on other devices that may be capable of communicating with the cloud-based computing system 28, the industrial automation equipment 16, or other components associated with the industrial application 24. Additionally, although the following method 90 describes a number of operations that may be performed, it should be noted that the method 90 may be performed in a variety of suitable orders and all of the operations may not be performed. It should be appreciated that the method 90 may be wholly executed by the computing device 26 or the execution may be distributed between the cloud-based computing system 28 and the computing device 26.

Referring now to the method 90, the processor 36 may receive data related to a procedure followed scoring factor (block 92). The data may be received from one or more sensors 18, cameras, input from the user, the cloud-based computing device 28, the automation controller 14, and the like. The procedures followed scoring factor may be considered by the scoring function to adjust the overall performance score of the technician 70. As previously discussed, the scoring function includes summing various weighted variables (e.g., scoring factors). In some embodiments, each of the scoring factors may be assigned a respective score and those respective scores may be added to produce the overall score for the component. It should be noted that some scoring factors may be weighted differently to influence the overall score more heavily than other scoring factors. The weights may be multipliers used to increase or decrease the weight of an associated factor.

The procedures followed scoring factor may be used influence the score calculated by the scoring function based on whether procedures were followed prior to performing a task, such as placing the industrial automation equipment 16 offline according to the lockout tagout protocol. For example, some preliminary procedures may include wearing the proper personal protection equipment (PPE), scanning an equipment tag, gathering parts needed for the task, notifying interested people that the task is about to be performed, and so forth. To illustrate, the processor 36 may receive data indicating that the technician 70 followed all procedures (e.g., wearing appropriate PPE) and generate a score for the procedures followed scoring factor representative of the points associated with following all procedures. In contrast, the processor 36 may receive data indicating that the technician 70 failed to follow certain procedures (e.g., is not wearing appropriate PPE) and generate a score for the procedures followed scoring factor representative of the points associated with failing to follow certain procedures that is lower than a score representative of the points associated with following the procedures.

The processor 36 may also receive data related to a task completion scoring factor (block 94). The data may be received from one or more sensors, cameras, input from the user, the cloud-based computing device 28, the automation controller 14, and the like. The task completion scoring factor may be considered by the scoring function to adjust the overall performance score of the technician 70 based on whether the technician 70 completed the task, such as placing the industrial automation equipment 16 offline according to the lockout tagout protocol. For example, each task may increase the overall score by varying amounts when the technician 70 completes the respective task. In some embodiments, more points may be associated with the more difficult or time consuming tasks than the less difficult tasks or less time consuming tasks to reward technicians 70 who complete the more difficult or time consuming tasks and/or incentivize technicians 70 to perform those tasks. It should be noted, that the tasks may be pre-configured as being more or less difficult/complex by a user of the software. As such, the processor 36 may generate a higher score for this technician scoring factor when the task is more difficult or time consuming tasks than when the task is less difficult or less time consuming. Further, this scoring factor may be used to assess efficiency and/or productivity of the technician 70.

The processor 36 may also receive data related to a time to complete task scoring factor (block 96). The data may be received from one or more sensors, cameras, input from the user, the cloud-based computing device 28, the automation controller 14, and the like. The time to complete task scoring factor may be considered by the scoring function to adjust the overall performance score of the technician 70 based on the amount of time it takes to complete a task. For example, each task may include an associated average amount of time for completion. The average amount of time may be determined based on averaging the amount of time it takes all of the technicians working in the associated factory locations to complete a respective task. The processor 36 may receive data indicating the amount of time it took the technician 70 to complete the task and compare that amount of time with the average time or a pre-configured amount of time expected to complete the task. A number of points may be associated with whether the technician 70 completes the task within a threshold range around the expected time, in less time than the threshold range, in an amount of time longer than the threshold range, and the like. The processor 36 may generate a certain score for this scoring factor if the technician 70 completes the task within a threshold range around the expected time, in less time than the threshold range, or both. On the other hand, the processor 36 may generate a lower score for this scoring factor if the technician 70 takes longer than the threshold range, which may be around the expected time for completion. Further, the time to complete a task scoring factor may be used to assess the efficiency and/or productivity of the technician 70.

The processor 36 may also receive data related to a training program technician scoring factor (block 98). The data may be received from one or more sensors 18, cameras, input from the user, the cloud-based computing device 28, the automation controller 14, and the like. The training program scoring factor may be considered by the scoring function to adjust the overall performance score of the technician 70 based on whether the technician 70 completed one or more training programs. For example, completing a training program related to performing a specific task, such as placing equipment offline according to the lockout tagout protocol, may be considered by the scoring function when determining the performance score for the technician 70. In some embodiments, the processor 36 may cause communication with the cloud-based computing system 28 to determine whether the technician has completed certain training programs and/or received certain certifications via the resources 46. A certain score may be generated for this scoring factor if the technician 70 completes the various training programs, and a lower score may be generated for this scoring factor if the technician 70 does not complete the training programs.

The processor 36 may also receive data related to a safety procedures scoring factor (block 98). The data may be received from one or more sensors 18, cameras, input from the user, the cloud-based computing device 28, the automation controller 14, and the like. The safety procedures scoring factor may be considered by the scoring function to adjust the overall performance score of the technician 70 based on whether the technician 70 completed one or more safety procedures. For example, one or more safety procedures may explain safety procedures that a technician should follow while performing a specific task, such as placing equipment offline according to the lockout tagout protocol. Completing the safety procedures related to the specific tasks may be considered by the scoring function when determining one or more scores for the technician 70. A certain score may be generated for this scoring factor if the technician 70 completes the various safety procedures, and a lower score may be generated for this scoring factor if the technician 70 does not complete the safety procedures.

As mentioned above, the processor 36 may generate an overall performance score for the technician 70 based on the technician scoring factors (block 102). To generate the performance score, the scoring function may sum the scores associated with each technician scoring factor. In addition, the technician scoring factors may be weighted differently depending on which technician scoring factor is more important to a user. For example, if completing the training program is less important than following procedures for a task, then the technician scoring factor for following procedures may be weighted more heavily.

The processor 36 may also control the operation of at least one industrial automation component 34 based on the score (block 104). For example, if a technician 70 receives a score below a threshold, then the processor 36 may disable access to the control of certain industrial automation equipment 16 to prevent the technician 70 from performing any procedures (e.g., lockout-tagout). In contrast, if a technician 70 receives a score above a threshold, then the processor 36 may enable access to control of certain industrial automation equipment 16 so the technician 70 can perform desired procedures (e.g., lockout-tagout).

Further, in some embodiments, the processor 36 may accumulate each score for the technician 70 to show the trends in the rating of the technician so that recommendations for increasing the rating may be made. For example, the computing device 26 and/or the cloud-based computing system 28 may recommend certain retraining for the technician 70 if the technician 70 is continuously slow at performing tasks. In some embodiments, the recommendations may increase the technician's score when followed, which may increase the score for the organization 54.

Figure 8:
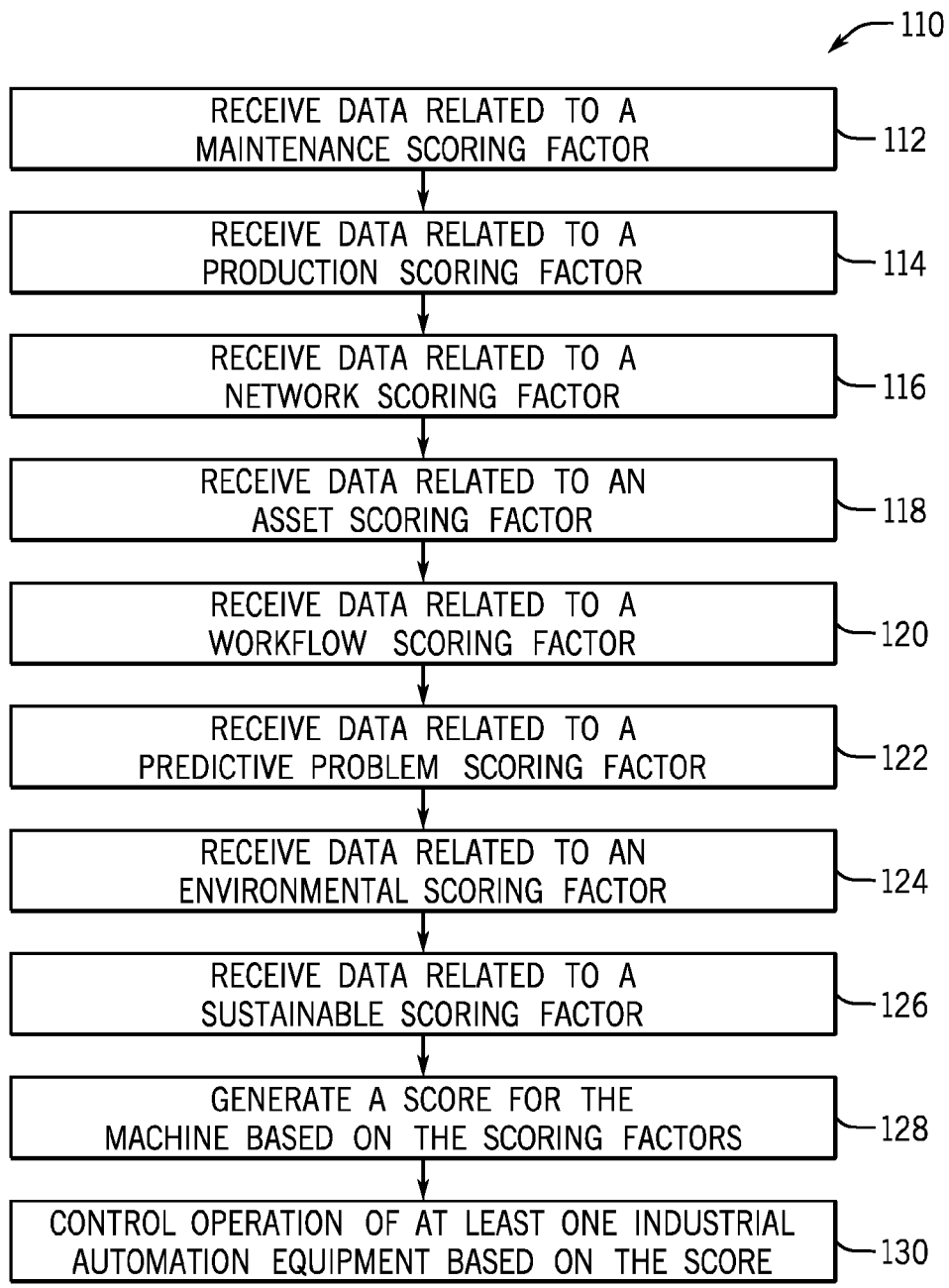
FIG. 8 is a flow diagram of a method for generating a score based on machine scoring factors, in accordance with embodiments presented herein.

FIG. 8 is a flow diagram of a method 110 for generating a score based on machine scoring factors, in accordance with embodiments presented herein. Although the following description of the method 110 is provided with reference to the processor 36 of the computing device 26, it should be noted that the method 110 may be performed by other processors disposed on other devices that may be capable of communicating with the cloud-based computing system 28, the industrial automation equipment 16, or other components associated with the industrial application 24. Additionally, although the following method 110 describes a number of operations that may be performed, it should be noted that the method 110 may be performed in a variety of suitable orders and all of the operations may not be performed. It should be appreciated that the method 110 may be wholly executed by the computing device 26 or the execution may be distributed between the cloud-based computing system 28 and the computing device 26.

Referring now to the method 110, the processor 36 may receive data related to a maintenance scoring factor (block 112). The data may be received from one or more sensors 18, cameras, input from the user, the cloud-based computing device 28, the automation controller 14, and the like. The maintenance scoring factor may be considered by the scoring function to adjust the overall performance score of the industrial automation equipment 16 based on the condition of the industrial automation equipment 16, whether the industrial automation equipment 16 is placed offline after a condition is detected, whether scheduled maintenance for the industrial automation equipment 16 has been performed, and/or the frequency of tasks performed on the industrial automation equipment 16, among other things. A number of points may be associated with each of the above events and/or properties related to the industrial automation equipment 16 and the points may be added to the score for the maintenance scoring factor when the event occurs or the property is met. For example, a certain score may be generated for the maintenance scoring factor if the processor 36 receives data indicating that an annual lockout tagout audit is overdue by a certain period of time (e.g., 2 weeks). In another example, a certain score may be generated for the maintenance scoring factor if the processor 36 receives data indicating that lockout tagout protocol was performed a certain number of times in a time period (e.g., lockout tagout was performed 10 times in a week). On the other hand, a higher score may be generated for the maintenance scoring factor if the processor 36 receives data indicating that scheduled inspections of the industrial automation equipment 16 are performed on time and reveal no maintenance conditions.

The processor 36 may also receive data related to a production scoring factor (block 114). The data may be received from one or more sensors 18, cameras, input from the user, the cloud-based computing device 28, the automation controller 14, and the like. The production scoring factor may be considered by the scoring function to adjust the overall performance score of the industrial automation equipment 16 based on the rate of producing an item (e.g., the number of items produced in a time period), and the like. A number of points may be associated with the above events and/or properties related to the industrial automation equipment 16 and the points may be added to the score for the production machine scoring factor when the event occurs or the property is met. For example, if data received by the processor 36 indicates that a high rate of production is achieved by the industrial automation equipment 16, then a certain score may be for the production scoring factor. On the other hand, if data received by the processor 36 indicates that the industrial automation equipment 16 has a low rate of production, then a lower score may be generated for the production scoring factor. Processes 16 may produce items at a low rate if the industrial automation equipment 16 has to be shut down for maintenance more than usual or is in poor condition, among other things.

The processor 36 may also receive data related to a network scoring factor (block 116). The data may be received from one or more sensors 18, cameras, input from the user, the cloud-based computing device 28, the automation controller 14, and the like. The network scoring factor may be considered by the scoring function to adjust the overall performance score of the industrial automation equipment 16 based on the quality of the network 30 that the industrial application 24 is using. For example, the quality of the network may consider the bandwidth of the network 30, connectivity information (e.g., time connected, number of disconnects, number of resets), and the like. A number of points may be associated with each of the above events and/or properties related to the network 30 and the points may be added to the score for the network scoring factor when the event occurs or the property is met. To illustrate, if the processor 36 receives data indicating that the network 30 provides high bandwidth (e.g., high amount of data throughput in a given time period), then a certain score may be generated for the network scoring factor. If the processor 36 receives data indicating that the network 30 provides low bandwidth (e.g., low amount of data throughput in the given time period), then a lower score may be generated for the network scoring factor 268.

The processor 36 may also receive data related to an asset scoring factor (block 118). The data may be received from one or more sensors 18, cameras, input from the user, the cloud-based computing device 28, the automation controller 14, and the like. The asset scoring factor may be considered by the scoring function to adjust the overall performance score of the industrial automation equipment 16 based on the condition of the assets, the age of the assets, whether the assets were recalled, and the like. A number of points may be associated with each of the above events and/or properties related to the assets and the points may be added to the score for the asset scoring factor when the event occurs or the property is met. To illustrate, if the processor 36 receives data indicating that a particular asset, such as a part, was recalled, then a certain score may be generated for the asset scoring factor. In some embodiments, a higher score may be generated for the asset scoring factor when the processor 36 receives data indicating that the assets are relatively new, in good condition, and the like.

The processor 36 may also receive data related to a workflow scoring factor (block 120). The data may be received from one or more sensors 18, cameras, input from the user, the cloud-based computing device 28, the automation controller 14, and the like. The workflow scoring factor may be considered by the scoring function to adjust the overall performance score of the industrial automation equipment 16 based on a property of the workflow used by the industrial application 24. A number of points may be associated with the above properties related to the workflow and the points may be added to the score for the workflow scoring factor when the property is met. For example, if the processor 36 receives data indicating that the workflow is efficient (e.g., produces items in less time than expected, conserves energy), then a certain score may be generated for the workflow scoring factor. However, if the processor receives data indicating that the workflow takes an unreasonable amount of time to complete or includes unnecessary steps, then a lower score may be generated for the workflow scoring factor.

The processor 36 may also receive data related to a predictive problem scoring factor (block 122). The data may be received from one or more sensors 18, cameras, input from the user, the cloud-based computing device 28, the automation controller 14, and the like. The predictive problem scoring factor may be considered by the scoring function to adjust the overall performance score of the industrial automation equipment 16 based on how well the machinery (e.g., automation controller 14) of the industrial application 24 solves predictive problems. A number of points may be associated with each of the above event and/or property related to the industrial automation equipment 16 and the points may be added to the score for the maintenance scoring factor when the event occurs or the property is met. For example, software may track how close an optimal solution determined by the industrial automation equipment 16 is to a desired solution. To illustrate, the industrial automation equipment 16 may use a predictive algorithm to determine a control trajectory of actions to take at points in time to arrive at a particular end state. The software may compare the desired end state to the actual end state that is arrived at by implementing the control trajectory. If the processor 36 receives data indicating that the two end states are within a threshold amount, then a certain score may be generated for the predictive problem scoring factor. If the processor 36 receives data indicating that the two end states vary by more than the threshold, then a lower score may be generated for the predictive problem scoring factor.

The processor 36 may also receive data related to an environmental scoring factor (block 124). The data may be received from one or more sensors 18, cameras, input from the user, the cloud-based computing device 28, the automation controller 14, and the like. The environmental scoring factor may be considered by the scoring function to adjust the overall performance score of the industrial automation equipment 16 based on the environmental impact of the industrial automation equipment 16. A number of points may be associated with each of the above property related to the industrial automation equipment 16 and the points may be added to the score for the maintenance scoring factor when the property is met sufficiently. For example, the environmental impact of the industrial automation equipment 16 may be based on one or more environmental properties of the industrial automation equipment 16, such as emissions, waste produced, amount of electricity used, type of electricity used (e.g., green energy, fossil fuel energy), and so forth. In some embodiments, a certain score may be generated for the environmental scoring factor if the processor 36 receives data indicating that the industrial automation equipment 16 is environmentally friendly, and a lower score may be generated for the environmental scoring factor if the processor receives data indicating that the industrial automation equipment 16 is not environmentally friendly.

The processor 36 may receive data related to a sustainable scoring factor (block 126). The data may be received from one or more sensors 18, cameras, input from the user, the cloud-based computing device 28, the automation controller 14, and the like. The sustainable scoring factor may be considered by the scoring function to adjust the overall performance score of the industrial automation equipment 16 based on one or more properties of the industrial automation equipment 16, such as its type, its parts, its frequency of operation, its requirements to operate, and so forth. A number of points may be associated with each of the above properties related to the industrial automation equipment 16 and the points may be added to the score for the maintenance scoring factor when the properties are met. If the processor 36 determines that the industrial automation equipment 16 is not reasonably sustainable based on the data received, then a certain score may be generated for the sustainable scoring factor. If the processor 36 determines that the industrial automation equipment 16 is reasonably sustainable based on the data received, then a higher score may be generated for the sustainable scoring factor 274.

As mentioned above, the processor 36 may generate an overall performance score for the industrial automation equipment 16 based on the machine scoring factors (block 128). To generate the performance score, the scoring function may sum the scores associated with each machine scoring factor. In addition, the machine scoring factors may be weighted differently depending on which machine scoring factor is more important to a user. For example, if maintenance of the industrial automation equipment 16 is the most important machine scoring factor, then a higher weight than the other weights may be assigned to the maintenance scoring factor.

The processor 36 may also control the operation of at least one industrial automation component 34 based on the score (block 130). For example, if the industrial automation equipment 16 receives a score below a threshold, then the processor 36 may execute a preventative action, such as powering down industrial automation equipment 16, causing the industrial automation equipment 16 to save energy by running certain industrial automation equipment 16 at non-peak hours, and the like. In contrast, if the industrial automation equipment 16 receives a score above a threshold, then the processor 36 may continue operating the machinery of the industrial automation equipment 16 normal.

Further, in some embodiments, the processor 36 may accumulate each score for the industrial automation equipment 16 to show the trends in the rating of the machinery so that recommendations for increasing the rating may be made. For example, the computing device 26 and/or cloud-based computing system 28 may recommend that alternatives to lockout-tagout be put in place when the machinery is taken offline more than a threshold number of times in a specified time period. In some embodiments, the recommendations may increase the machinery's score when followed, which may increase the score for the organization 54.

Figure 9:
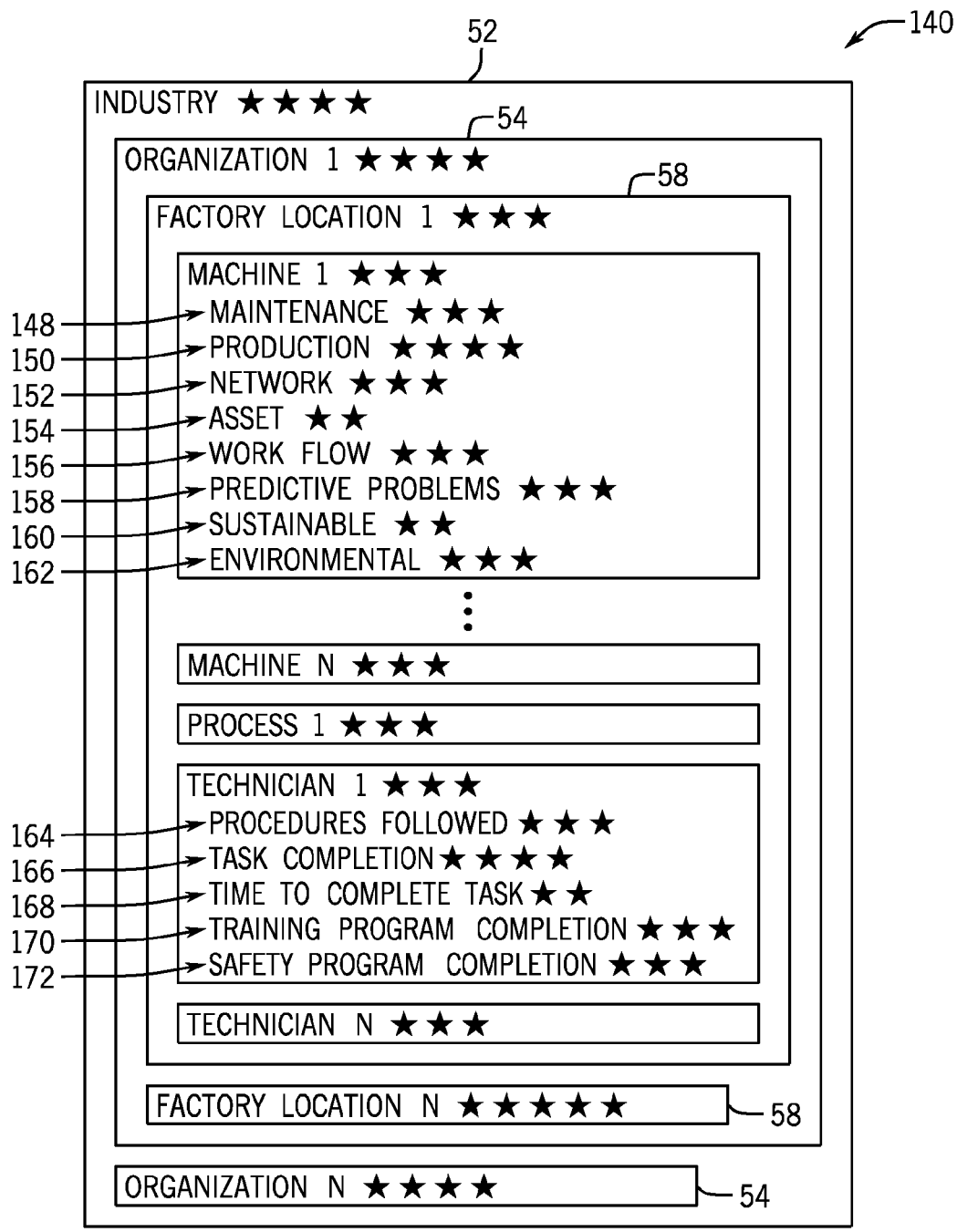
FIG. 9 is a sample display screen showing the scores for the items of the industrial enterprise determined by the method of FIG. 6, in accordance with embodiments presented herein.

FIG. 9 is a sample display screen 140 showing the scores for the items of the industrial enterprise hierarchy 50 determined by the method 80 of FIG. 6, in accordance with embodiments presented herein. As depicted, each component has one or more associated "stars" that are indicative of the score determined by the scoring function. It should be appreciated that any suitable graphical indicator may be used to represent the scores. In the depicted embodiment, the scoring range includes one "star" representing the lowest score and five "stars" representing the highest score. However, any suitable range of scores may be used. It should also be noted that the scores depicted in the embodiment are representative of the components' rating.

As illustrated, at the top level of the industrial enterprise hierarchy 50, the industry 52 generated a score of four "stars" based on the scores of the components included in its sublevel, which are its organizations 54. In some embodiments, the scoring function may calculate the score for an upper level in the hierarchy 50 by averaging the scores of the components in its sublevel. For example, a score of four "stars" is generated for "organization 1" and a score of four "stars" is generated for "organization N". Thus, the average score of "organization 1" and "organization N" equals four "stars" and that is the score generated for their upper level component (e.g., industry 52).

Regarding "organization 1," its score of four "stars" may be calculated by the scoring function averaging the components included in the sublevel of "organization 1." For example, a score of three "stars" is generated for "factory location 1" and a score of five "stars" is generated for "factory location N." Thus, their average equals four "stars" and that is the score generated for "organization 1."

The score generated for each factory location may be based on its respective components. For example, as illustrated, "factory location 1" may include "machine 1," "machine N," "process 1," "technician 1," "technician N," and any other component or person that is typically included in a factory location. In some embodiments, the score generated for "factory location 1" may be calculated by the scoring function averaging the scores of its components, which results in a score of three "stars."

Further, as illustrated, "machine 1" includes a score of three "stars," which is calculated by the scoring function by summing the various weighted machine scoring factors 148-162. Each machine scoring factor 148-162 includes its own individual score, as described above. For example, the maintenance machine scoring factor 148 includes a score of three "stars," the production scoring factor 150 includes a score of four "stars," the network scoring factor 152 includes a score of three "stars," the asset scoring factor 154 includes a score of two "stars," the workflow scoring factor 156 includes a score of three "stars," the predictive problems scoring factor 158 includes a score of three "stars," the sustainable scoring factor 160 includes a score of two "stars," and the environmental scoring factor 162 includes a score of three "stars." After summing the various scores for the scoring factors 148-162 and considering the weights assigned to each, the scoring function calculated an overall performance score for "machine 1" of three "stars."

Additionally, as illustrated, "technician 1" includes a score of three "stars," which is calculated by the scoring function summing the various weighted technician scoring factors 164-172. Each technician scoring factor 164-172 includes its own individual score, as described above. For example, the procedures followed scoring factor 164 includes a score of three "stars," the task completion scoring factor 166 includes a score of four "stars," the time to complete task scoring factor 168 includes a score of two "stars," the training program completion scoring faction 170 includes a score of three "stars," and the safety procedures completion scoring factor 172 includes a score of three "stars." After summing the various scores for the scoring factors 164-172 and considering the weights assigned to each, the scoring function calculated an overall score for "technician 1" 70 of three "stars."

It should be understood that each level may be collapsible to hide the underlying sublevel information. Also, the layout of the various components may be arranged in any suitable manner on a display screen and the display screen 140 depicted is for illustrative purposes.

Various standard monitoring measures may be used in facilities, such as factories and/or plants, to ensure that technicians working in the facilities are properly performing within the facilities. Certain procedures performed by the technicians, machinery, and/or processes in a factory, plant, and the like, may involve measures in place to inhibit mistakes and to ensure that the procedures are executed properly. For example, in most facilities, technicians are instructed to wear certain personal protective equipment (PPE) (e.g., gloves, goggles, helmet, shoes, earplugs, apron, face mask) in specified areas and/or while performing certain procedures on machine systems or processes within the facilities. One such procedure is shutting down the industrial automation equipment 16 according to a corresponding lockout-tagout protocol.

As previously discussed, lockout tagout may include a series of steps that are to be performed in order to properly shut down the process. The steps may be presented to a user on the computing device 36. In some embodiments, lockout tagout protocol may indicate that the technician wear certain PPE prior to starting the procedure and during each step of the shut down procedure. Generally, the usage of the PPE by the technicians 70 is monitored by other humans in the facilities. However, automated monitoring may also be useful for rating operations and maintaining standards.

Accordingly, some embodiments of the disclosure relate to enhanced standard monitoring in a facility, such as the automatic monitoring of PPE usage and other standards. For example, in some embodiments, the PPE may be monitored and certain steps of the lockout-tagout procedure may not be enabled on the software included on the computing device if the technician 70 is not wearing the proper PPE. Cameras or sensors 18 may be used to determine whether technicians 70 interacting with a machine or entering a machine area are wearing appropriate PPE. As described below, certain PPE may include an electronic tag that may be scanned before the respective technician 70 is allowed to enter an area or have access to control of a machine. That is, a processor 36 may first verify that signals are received from a sensor 18 that indicate that appropriate PPE is being used by the technician 70 before allowing the technician 70 to begin certain procedures, including controlling the machine, to place the machine offline (e.g., using lockout-tagout), or the like.

Also, information related to PPE usage and actions of the technicians 70, such as whether the technician 70 touched a machine or carried a cellular phone that was powered on, may be tracked by the software on the computing device 26 while the technician 70 performs certain procedures on a machine or is within a machine area. The information may be used to evaluate the technician's performance. For example, the technician 70 may receive a score based on at least whether he/she wore the appropriate PPE, followed procedures, did not perform certain actions, and the like, as discussed above.

Figure 10:
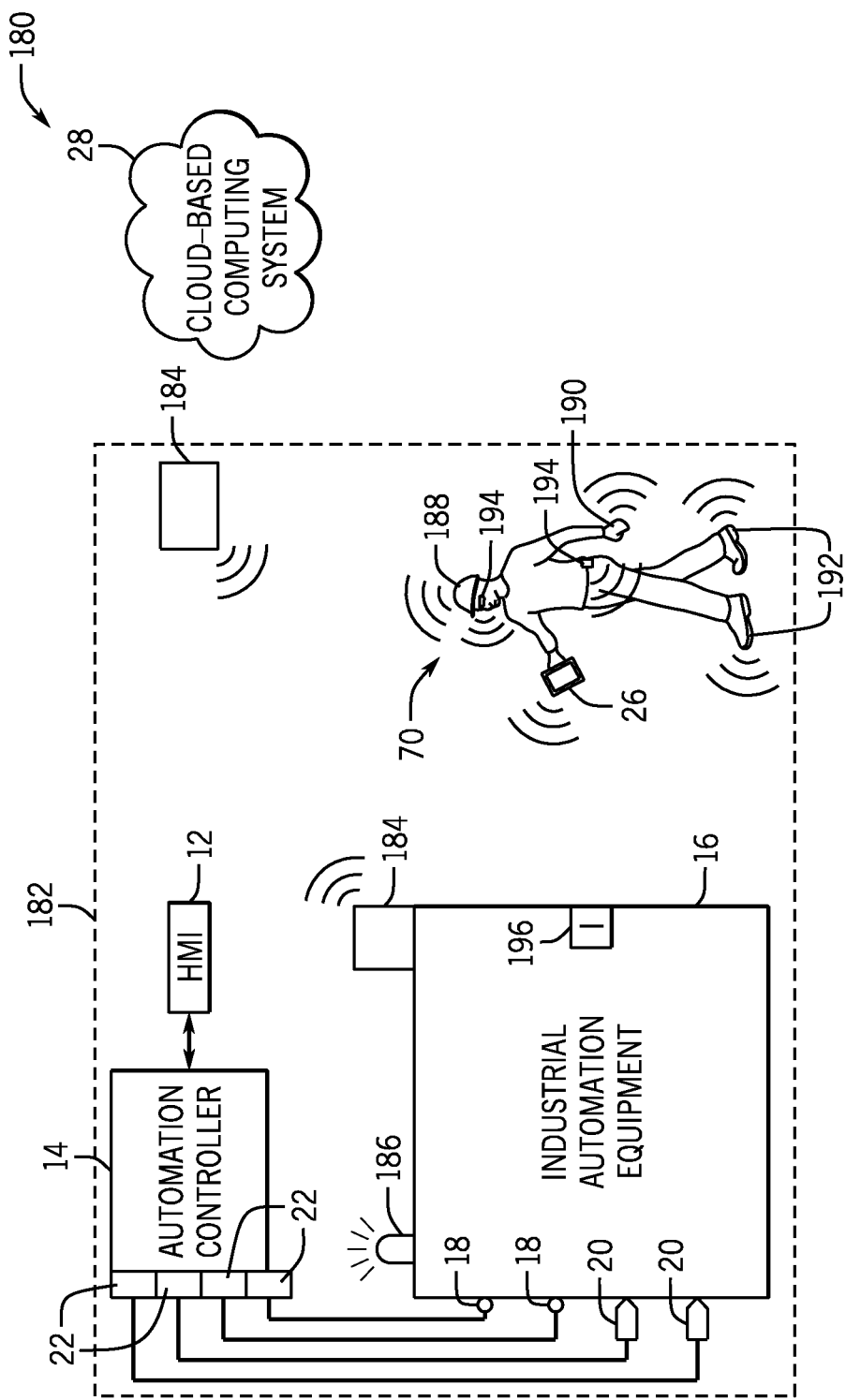
FIG. 10 is a schematic diagram of a system including enhanced standard monitoring in a facility, in accordance with embodiments presented herein.

FIG. 10 is a schematic diagram of a system 180 including enhanced standard monitoring in a facility, in accordance with embodiments presented herein. As depicted, the system 180 may include the industrial automation equipment 16 operating in a process area 182 of a facility. Components that are part of the system 180 are adapted to interface with networked components and configuration equipment in accordance with embodiments of the presently disclosed techniques. In FIG. 10, the system 180 is illustrated as including the HMI 12 and the control/monitoring device or automation controller 14 adapted to interface with components of the industrial automation equipment 16, as described above.

In addition to the components described above with respect to FIG. 1, one or more apparatuses 184 may be employed by or work in conjunction with various types of the industrial automation equipment 16. The apparatuses 184 may be located at any suitable position on the industrial automation equipment 16 and may be configured to obtain data, read data, receive data, process data, transmit data, and the like. In some embodiments, the apparatuses 184 may include a camera, a sensor, and the like. The apparatuses 184 may be communicatively coupled to the computing device 26, the cloud-based computing system 28, and/or the automation controller 14. The information obtained by the apparatuses 184 may be used to determine whether the technician 70 interacting with the industrial automation equipment 16 or entering the process area 182 is wearing appropriate PPE. As such, in embodiments where the apparatuses 184 include cameras, the cameras may configured to obtain videos and/or pictures (e.g., image data) of the technician 70 and a control system may receive the image data from the cameras and determine whether the technician 70 is wearing appropriate PPE. Accordingly, a control system (e.g., cloud-based computing system 28, computing device 26, automation controller 14) may use recognition technology, such as object recognition, facial recognition, voice recognition, and the like to determine whether the technician 70 is wearing appropriate PPE. Additionally, in embodiments where the apparatuses 184 include sensors 18, the control system may first verify that the sensors 18 receive signals indicative of PPE usage at the industrial automation equipment 16 and/or process area 182 before allowing the technician 70 to begin certain procedures, including controlling the industrial automation equipment 16, to place the industrial automation equipment 16 offline (e.g., using lockout-tagout), and the like. To that end, the apparatuses 184 may include radio-frequency identification (RFID) readers configured to read signals from an RFID electronic tag included in the PPE.

Indeed, the apparatuses 184 may include any suitable receiver circuit configured to receive signals transmitted from any suitable transmitter circuit included in the PPE. The signals received by the receiver circuit may include data related to whether the set of PPE is being worn, whether the set of PPE is being worn properly, a timestamp of when the set of PPE is worn, or some combination thereof If at any time the control system determines that the appropriate PPE is not being worn by the technician 70, one or more preventative actions may be executed. For example, the preventative actions may include sending control signals to the automation controller 14 to shut down the industrial automation equipment 16, sending control signals to gating to access the industrial automation equipment 16 to not open, sending an alert to a control console in a workstation (e.g., computer, phone, tablet), preventing the software on the computing device 26 from advancing to the next sequence of steps in the lockout-tagout procedures, triggering an alarm or warning (e.g., visual, audible, vibratory) on the computing device 26, in the process area 182, in the facility, and/or at the control console in the workstation, or some combination thereof.

In some embodiments, the processor 36 of the computing device 26 may operate software to guide the technician 70 through a particular procedure, such as a lockout-tagout protocol. When the processor 36, the cloud-based computing system 28, and/or the automation controller 14 determines that the technician 70 is not wearing appropriate PPE, various steps of the lockout-tagout procedure may be disabled on a graphical user interface (GUI) of the software until the technician 70 wears the appropriate PPE. That is, the steps may be grayed out and not operable when activated, clicked, touched, or by any method of input. In addition, the computing device 26 and/or the cloud-based computing system 28 may send signals to the automation controller 14 to prevent the technician 70 from performing any operations until the appropriate PPE is worn.

Further, the apparatuses 184 may be located at various places throughout the process area 182. For example, the apparatuses 184 may be located at an entrance and/or exit to the process area 182. In some embodiments, the apparatuses 184 may be sensors disposed on a gate that the technician 70 ingresses and egresses to the process area 182 so that the sensors may read electronic tags or receive signals from the electronic tags on the PPE to determine whether the technician 70 is wearing the appropriate PPE for that particular process area 182. In another example, as depicted, the apparatuses 184 may include a camera that is installed on the ceiling in the process area 182. It should be noted that the apparatuses 184 may include wireless circuitry to enable wireless communication over any suitable network (e.g., WiFi, Bluetooth®, ZigBee®). Additionally or alternatively, the apparatuses 184 may be configured to communicate via wires (e.g., Ethernet).

In some embodiments, the industrial automation equipment 16 may also include a beacon 186 to improve operations within a facility. The beacon 186 may be present inside or outside the process area 182, and the beacon 186 may be configured to prevent cellular phone calls to be received while in proximity to the beacon 186. The beacon 186 may block cellular signals by broadcasting radio signals that disrupts the cellular signals. In this manner, the technician 70 performing operations within the industrial automation equipment 16 may not be distracted by cellular phone calls.

As depicted, the technician 70 is wearing various PPE. The PPE may include a helmet 188, gloves 190, shoes 192, goggles 194, name tag 194 (e.g., includes personal information such as name, address, allergies to medication, emergency contact, blood type, etc.), and so forth. The PPE that is required to be worn by the technician 70 may vary depending on the type of the industrial automation equipment 16 being serviced, maintained, and/or controlled, and/or on the type of procedure to be performed. It should be understood that any suitable type of PPE may be included in the techniques disclosed herein. In some embodiments, the PPE may include an electronic tag including data (e.g., identification, type, timestamp of when the PPE was put on by the technician 70, whether the PPE is being worn properly, whether the PPE is taken off) related to the PPE. The data may be sent to the computing device 26 and/or the cloud-based computing system 28 for analysis, such as determining whether the technician 70 is wearing the PPE, how long the technician 70 has been wearing the PPE, whether the technician 70 is wearing the PPE properly, and so forth.

As illustrated, the industrial automation equipment 16 may also include a human impedance detector 196. The human impedance detector 196 may be configured to determine whether a human physically contacts a surface of the industrial automation equipment 16. If the human impedance detector 196 determines that a human is touching the machinery, signals may be sent to the automation controller 14 and the machinery may be automatically powered off. Additionally or alternatively, the human impedance detector 196 may send signals to the computing device 26 and/or the cloud-based computing system 28 when it is determined that a human is touching the industrial automation equipment 16. The human impedance detector 196 may be a module that is configurable and capable of operating with and interacting with different types of processes.

In some embodiments, the usage of the PPE may be tracked by the computing device 26 and/or the cloud-based computing system 28. That is, the computing device 26 and/or the cloud-based computing system 28 may receive signals from the electronic tags or devices associated with each PPE, from the apparatuses 184, or both that indicate that the respective PPE is being worn, the time at which the PPE is being worn, whether the PPE is taken off, whether the PPE is being worn properly, and the like. This information may be tracked and used to evaluate the technician's performance. For example, a score may be generated for the technician 70 based at least on PPE usage. If the technician 70 is wearing all of the appropriate PPE, then a high score may be generated for the technician 70. The scores may be generated by the computing device 26 and/or the cloud-based system 28, and the scores may be saved. Upper management can view the scores of the technicians 70 to make informed decisions regarding which technicians 70 are performing procedures properly and/or are following preventative guidelines by using appropriate PPE. The scores may be saved and different views may be available to users of the tracking software. For example, a user may be able to view the technician's scores over the past week, month, year, etc. The scores may be updated continuously as the technician 70 performs each procedure on the industrial automation equipment 16 and/or in the process area 182.

Figure 11:
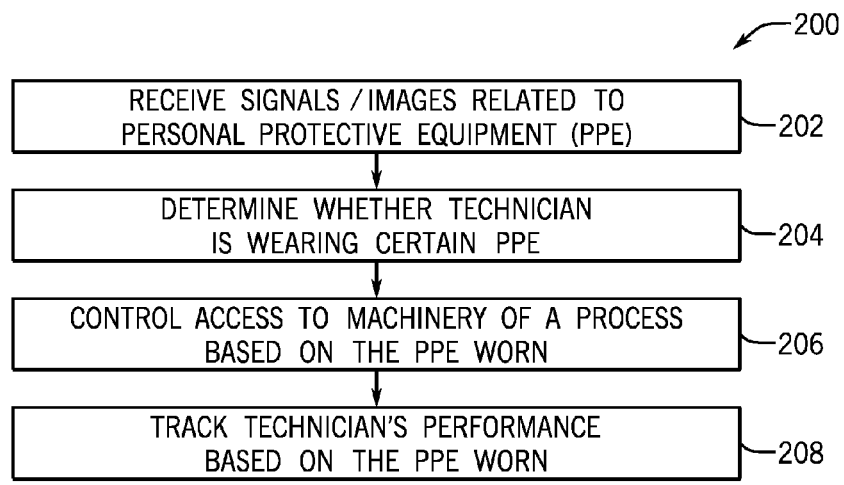
FIG. 11 is a flow diagram of a method for controlling machinery of a process based on personal protective equipment usage, in accordance with embodiments presented herein.

FIG. 11 is a flow diagram of a method 200 for controlling the industrial automation equipment 16 based on personal protective equipment (PPE) usage, in accordance with embodiments presented herein. The method 200 may be implemented as instructions stored on the memory 37 and executed by the processor 36 of the computing device 26. Although the following description of the method 200 is provided with reference to the processor 36 of the computing device 26, it should be noted that the method 200 or certain operations of the method 200 may be performed by other processors disposed on other devices (e.g., automation controller 14, cloud-based computing system 28) that may be capable of communicating with the cloud-based computing system 28, the industrial automation equipment 16, or other components associated with the industrial application 24. Additionally, although the following method 200 describes a number of operations that may be performed, it should be noted that the method 200 may be performed in a variety of suitable orders and all of the operations may not be performed.

Referring now to the method 200, the processor 36 may receive signals/images related to personal protective equipment (PPE) (block 202). The signals/images may be sent from the apparatuses 184 (e.g., sensors, cameras) located on or near the industrial automation equipment 16 and/or in the process area 182. The signals/images may be received by the communication component 34 of the computing device 26. Additionally or alternatively, the signals/images may be sent by the cloud-based computing system 28 in embodiments where the apparatuses 184 send the signals/images to cloud-based computing system 28. The signals/images may include data signals that indicate various characteristics of the associated PPE. For example, the data signals received may include an acknowledgement that the PPE is being worn, that the PPE is being worn properly, the length of time the PPE has been worn, and the like. Additionally, in some embodiment the signals/images may include image data that captures still pictures and/or video of the technician 70.

The signals/images may be used to determine whether the technician 70 is wearing the appropriate PPE (block 204). The appropriate PPE or a set of PPE may include one or more of the various types of PPE described above. In some embodiments, the set of PPE may be determined based on the corresponding industrial automation equipment 16, known procedures, and the like. Generally, the set of PPE being evaluated at block 204 corresponds to one or more individual items of PPE that should be worn or present with the technician 70 when performing a certain operation. In some embodiments, if acknowledgement signals are received for respective PPE, the processor 36 may determine that the technician 70 is wearing the respective PPE. However, the processor 36 may determine that the technician 70 is not wearing certain PPE if acknowledgment signals are not received for the respective PPE, and/or the processor 36 may determine that the technician 70 is not wearing the PPE properly if signals are received that indicate the technician 70 is not wearing the PPE properly.

Certain procedures performed on the industrial automation equipment 16 may require the technician 70 to wear certain PPE based on the type of procedure. For example, shutting down the industrial automation equipment 16 using lockout tagout may require that the technician 70 wears gloves 190, a helmet 188, shoes 192, goggles 194, and the like. Thus, after the processor 36 determines which PPE the technician 70 is wearing, the processor 36 may control access to the industrial automation equipment 16 based on the PPE worn (block 206). That is, the processor 36 may send control signals to certain industrial automation equipment 16 including the automation controller 14 to allow or prevent the technician 70 access to control of the industrial automation equipment 16. Further, control of the industrial automation equipment 16 may be accessed/denied based on the PPE worn by enabling/disabling certain steps of the procedure being performed on a graphical user interface (GUI) of the software used to guide the technician 70 through the procedure. In addition, certain types of procedures in their entirety may be denied/not accessible until the appropriate PPE is worn. For example, those types of procedures may be grayed out (e.g., still visually seen but not usable or able to be selected) on the GUI.

To illustrate, if the processor 36 determines that the technician 70 is wearing the required PPE, is wearing the PPE properly, and/or has worn the PPE for a threshold amount of time, then control signals may be sent to the industrial automation equipment 16 including the automation controller 14 to allow the technician 70 access to control the industrial automation equipment 16. Additionally, the steps and functionalities to control the industrial automation equipment 16 to perform the procedure may be enabled on the GUI. In contrast, if the processor 36 determines that the technician 70 is not wearing the required PPE, is not wearing it properly, and/or has not been wearing it for a threshold period of time, then control signals may be sent to the industrial automation equipment 16 including the automation controller 14 to prevent the technician 70 access to control the industrial automation equipment 16. Additionally, certain steps and/or functionalities to control the industrial automation equipment 16 to perform the procedure may be disabled (e.g., grayed out, inoperable) on the GUI. If the technician 70 is granted access to control industrial automation equipment 16, the technician 70 may follow the steps presented by the software on the display 42 to carry out the procedure (e.g., lockout tagout).

The processor 36 may also track the technician's performance based on the PPE worn (block 208). The processor 36 may track the technician's performance by storing whether the technician 70 wore the appropriate PPE for procedures performed or attempted to perform, whether the technician 70 took off the PPE during the procedure, the times at which the technician 70 wore the PPE, and the like. Additionally or alternatively, the processor 36 may track the progress of the technician 70 as the technician performs each step of the procedure (e.g., lockout tagout). That is, the processor 36 may determine the length of time it took the technician 70 to complete each step, the elapsed time it took to complete the procedure, and the like, which may be used in assessing the productivity and efficiency of the technician. The information related to the technician's PPE usage may be stored locally in the memory 37 or in the cloud-based computing system 28.

In some embodiments, an overall performance score may be generated for the technician's PPE usage for each procedure performed. The performance score may be continuously updated as the technician 70 performs additional procedures. The performance score may be based on how well the technician follows the procedures set forth by the software. In some embodiments, how well the technician follows procedures includes whether the technician 70 wears the appropriate PPE. To calculate a score for PPE usage, a scoring function may include summing various weighted variables (e.g., PPE). In some embodiments, each of the PPE may be assigned a number of points and those points may be added to produce the performance score for the technician's PPE usage for a particular procedure. It should be noted that the various PPE may be weighted differently to influence the overall score more heavily than other PPE. The weights may be multipliers used to increase or decrease an associated PPE's affect on the performance score. For example, certain PPE may be more important to performance than other PPE depending on the type of procedure being performed, and, thus, may receive a heavier weight.

The performance score may be used to assess certain other qualities of the technicians 70, as well. For example, the performance score may be used to determine the technician's efficiency at completing tasks, productivity, estimated time to completion of respective tasks, and so forth.

After the score is generated for the technician 70, the score may be displayed on the display 42 of the computing device 26. In some embodiments, the score may be sent to the cloud-based computing system 28 and accessed by upper management using another electronic device to monitor the technicians' performances.

Figure 12:
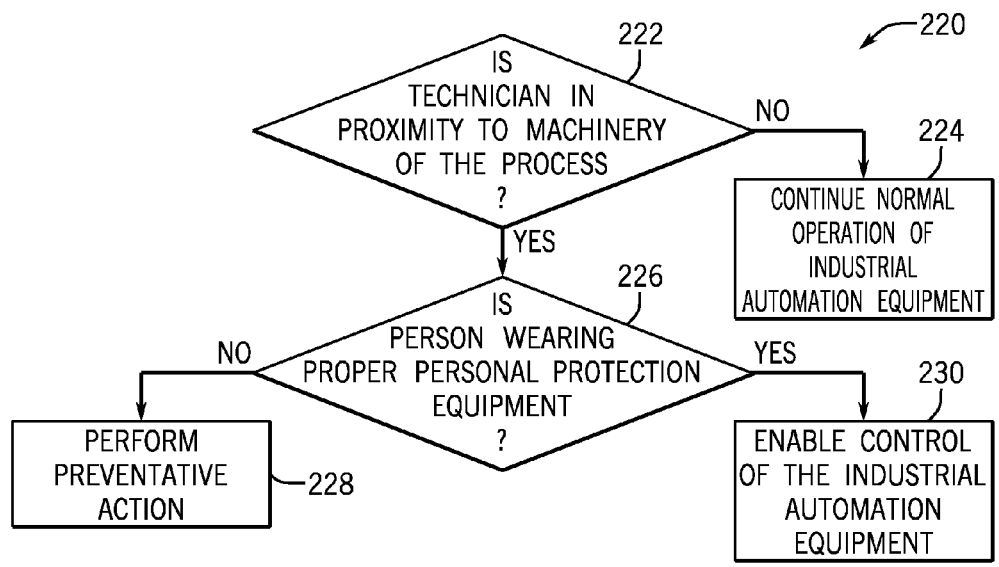
FIG. 12 is a flow diagram of another method for controlling machinery of a process based on personal protective equipment usage, in accordance with embodiments presented herein.

FIG. 12 is a flow diagram of another method 220 for controlling industrial automation equipment 16 based on personal protective equipment (PPE) usage, in accordance with embodiments presented herein. The method 220 may be implemented as instructions stored on the memory 37 and executed by the processor 36 of the computing device 26. Although the following description of the method 220 is described with reference to the processor 36 of the computing device 26, it should be noted that the method 220 or certain operations of the method 220 may be performed by other processors disposed on other devices (e.g., automation controller 14, cloud-based computing system 28) that may be capable of communicating with the cloud-based computing system 28, the industrial automation equipment 16, or other components associated with the industrial application 24. Additionally, although the following method 220 describes a number of operations that may be performed, it should be noted that the method 220 may be performed in a variety of suitable orders and all of the operations may not be performed.

Referring now to the method 220, the processor 36 may determine whether the technician 70 is in proximity to the industrial automation equipment 16 (block 222). In some embodiments, being in proximity to the industrial automation equipment 16 may include being within the process area 182. Thus, the processor 36 may determine whether the technician 70 is in proximity to the industrial automation equipment 16 based on signals/images received from certain of the apparatuses 184 near the entrances and/or exits to the process area 182. For example, a sensor at an entrance gate may send signals to the computing device 26 and/or cloud-based computing system 28 when movement is detected or an electronic tag on PPE worn by the technician 70 is detected. Also, image data may be obtained by a camera and sent to the computing device 26 and/or cloud-based computing system 28 when the technician 70 enters the process area 182.

If the technician 70 is not in proximity to the industrial automation equipment 16, then the method 220 may include continuing normal operation of the industrial automation equipment 16 (method block 224). If the technician 70 is within proximity to the industrial automation equipment 16, then the method 220 may include the processor 36 determining whether the technician 70 is wearing the appropriate PPE (block 226). As previously discussed, this step 226 may include the processor 36 analyzing signals/images received from the apparatuses 184, or lack thereof, to determine whether the technician 70 is wearing the appropriate PPE, is wearing the appropriate PPE properly, has been wearing the PPE for a threshold amount of time, has taken off the PPE, and the like.

If the technician 70 is not wearing the appropriate PPE, is not wearing the appropriate PPE properly, has not worn the PPE for a threshold amount of time, has taken off the PPE, or the like, then the processor 36 may perform a preventative action (block 228). As previously discussed, the preventative action may include sending control signals to the industrial automation equipment 16 including the automation controller 14 to power off the industrial automation equipment 16 and/or to prevent the technician 70 from accessing control of the industrial automation equipment 16. Additionally, the preventative action may include alerting the user on the computing device 26 to put on the appropriate PPE, sending an alert to a control center in a workstation, triggering an alarm in the facility, and so forth. Further, a preventative action may include disabling certain steps for a particular procedure, such as powering off the industrial automation equipment 16 using lockout tagout, on a graphical user interface (GUI) of the software used to guide the technician through the procedure. Disabling the steps on the GUI may include graying out and/or turning off interactive properties of visual elements (e.g., buttons, gauges, text input) related to the prohibited steps.

If the technician 70 is wearing appropriate PPE, then the processor 36 may enable the technician 70 to access control of the industrial automation equipment 16 (block 230). Enabling access to control of the industrial automation equipment 16 may include the computing device 26 and/or the cloud-based computing system 28 sending control signals to the industrial automation equipment 16 including the automation controller 14 indicating that the technician 70 is wearing proper PPE and is authorized to perform a specified procedure. Further, the software that includes steps for a particular procedure, such as shutting down the industrial automation equipment 16 using lockout tagout, may enable visual elements (e.g., buttons, gauges, text input) on a graphical user interface (GUI) that represent the steps so the user may interact with the industrial automation equipment 16 via the software.

It should be noted that the method 200 and the method 220 are performed using the processor 36 that is part of the computing device 26 and the cloud-based computing system 28. The computing device 26 and the cloud-based computing system 28 are configured to execute software applications that enable each device to interact with the industrial automation equipment 16. As such, the computing device 26 and the cloud-based computing system 28 are tied to particular machines, such that a tri-partite system is created to assist in the management and operations of the industrial automation equipment 16, and thus the industrial application 24. Moreover, it should be noted that the data received by the computing device 26, the cloud-based computing system 28, the industrial automation component 34, or the control/monitoring device 14 may be transformed when being transmitted, analyzed, or depicted for view by a user of the respective device. For example, the scores generated based on signals received from sensors 18 and/or input signals received include a transformation of the signals to an associated score.

Technical effects of the embodiments described herein include assessing a quality of an industrial enterprise. The industrial enterprise quality assessment may be enabled by coordinating the transfer of data between the computing device 26, the cloud-based computing system 28, and the industrial automation equipment 16. In some embodiments, the industrial enterprise quality assessment may determine scores for the items (e.g., organizations, factories, technicians, machines) of an industrial enterprise hierarchy 50. By efficiently sharing data between these components, operations and maintenance of the industrial application 24 may be performed more efficiently, and informed decisions may be made more readily based on scores associated with the items of the industrial enterprise hierarchy 50.

Further technical effects of the embodiments described herein include enhanced standard monitoring of an industrial automation system 28, such as controlling access to the industrial automation equipment 16 based on PPE usage, controlling functionality of a GUI that provides steps to perform a procedure on industrial automation equipment 16 based on PPE usage, tracking and generating a score for the performance of a technician 70 based on PPE usage, and/or improving operations of technicians 70 using a human impedance detector 196 and/or a beacon 186. The enhanced standard monitoring may be enabled by coordinating the transfer of data between the apparatuses 184, the computing device 26, the cloud-based computing system 28, and/or the industrial automation equipment 16. By efficiently sharing data between these components.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A tangible, non-transitory computer-readable medium comprising computer instructions configured to:
receive image data from an apparatus, wherein the image data comprises a person within a proximity to an industrial automation device;
determine whether the person is wearing a set of personal protection equipment (PPE) based on the image data;
disable one or more operations of the industrial automation device in response to determining that the person is not wearing the set of PPE by ignoring inputs received from the person, wherein the inputs are configured to control the industrial automation device; and
track a usage of the set of PPE.

2. The computer-readable medium of claim 1, wherein the computer instructions are configured to disable the one or more operations by disabling one or more functionalities of the industrial automation device presented on a graphical user interface (GUI) displayed on a device associated with the person.

3. The computer-readable medium of claim 1, wherein the computer instructions are configured to track the usage of the set of PPE by generating a score associated with the person based on the usage of the set of PPE and storing the score on the computer-readable medium, on a cloud-based computing system, or some combination thereof.

4. The computer-readable medium of claim 1, wherein the computer instructions are configured to enable the one or more operations of the industrial automation device in response to determining that the person is wearing the set of PPE.

5. The computer-readable medium of claim 1, wherein the computer instructions are configured to acknowledge receipt of the inputs received from the person.

6. A method comprising:
receiving, via a processor, image data from an apparatus, wherein the image data comprises a person within a proximity to an industrial automation device;
determining, via the processor, whether the person is wearing a set of personal protection equipment (PPE) based on the image data;
disabling, via the processor, one or more operations of the industrial automation device in response to determining that the person is not wearing the set of PPE, wherein disabling the one or more operations of the industrial automation device comprises disabling one or more functionalities of the industrial automation device presented on a graphical user interface (GUI) by the processor; and
tracking, via the processor, a usage of the PPE.

7. The method of claim 6, wherein tracking the usage of the set of PPE comprises generating a score based on the usage of the set of PPE and storing the score.

8. The method of claim 6, comprising enabling, via the processor, the one or more operations of the industrial automation device in response to determining that the person is wearing the set of PPE.

9. The method of claim 8, wherein enabling the one or more operations of the industrial automation device comprises enabling the one or more functionalities of the industrial automation device presented on the GUI by the processor.

10. A system, comprising:
   an industrial automation device configured to perform an automated operation and to operate in an area of a facility;
   an apparatus configured to detect whether a person within a proximity of the industrial automation device is wearing a set of personal protection equipment (PPE); and
   a processor configured to:
      disable operations of the industrial automation device in response to determining that the person is not wearing the set of PPE;
      track usage of the set of PPE by the person by generating a score for the person based on the usage of the set of PPE and storing the score on a storage device, wherein the score comprises a quantification of the usage of the set of PPE by the person; and
      store the usage of the set of PPE on the storage device.

11. The system of claim 10, wherein the apparatus comprises a camera configured to obtain image data associated with the person within the proximity of the industrial automation device.

12. The system of claim 11, wherein the processor is configured to receive the image data from the camera and determine whether the set of PPE is being worn by the person using recognition technology.

13. The system of claim 10, wherein the apparatus comprises a receiver circuit configured to receive signals from a transmitter circuit disposed on the set of PPE.

14. The system of claim 13, wherein the signals received by the receiver circuit comprise data related to whether the set of PPE is being worn, whether the set of PPE is being worn properly, a timestamp of when the set of PPE is worn, or some combination thereof.

15. The system of claim 10, wherein the apparatus comprises a radio-frequency identification (RFID) reader configured to read an RFID tag disposed on each PPE of the set of PPE.

16. The system of claim 10, wherein the processor is configured to disable the operations of the industrial automation device by disabling one or more functionalities of the industrial automation device presented on a graphical user interface (GUI) of a computing device.

17. The system of claim 16, wherein disabling the one or more functionalities comprises making one or more certain visual elements inoperable while continuing to detect whether the person within the proximity of the industrial automation device is wearing the set of PPE.

18. The system of claim 10, comprising a human impedance detector disposed on the industrial automation device, wherein the human impedance detector is configured to:
   detect when the person is touching the industrial automation device; and
   transmit one or more signals indicating that the person is touching the industrial automation device to a computing device including the processor, an automation controller connected to the industrial automation device, a cloud-based computing system, or some combination thereof.

19. The system of claim 10, comprising a beacon located on or proximate to the industrial automation device, wherein the beacon is configured to prevent a cellular phone from receiving calls within a different proximity to the beacon.

20. The system of claim 10, wherein the processor is configured to determine the quantification of the usage of the set of PPE by the person by summing a weighted variable associated with each PPE of the set of the PPE used by the person.

\* \* \* \* \*